(12) United States Patent
Zivkovic et al.

(10) Patent No.: US 11,636,714 B2
(45) Date of Patent: Apr. 25, 2023

(54) METHOD AND SYSTEM FOR MANAGING PARKING BY DUAL LOCATION VERIFICATION

(71) Applicant: REEF Global IP LLC, Miami, FL (US)

(72) Inventors: Milan Zivkovic, Langley (CA); Charles Arendt, Menlo Park, CA (US); Peter Poon, Vancouver (CA); Michael Heyd, Vancouver (CA); Zachary Taylor, Halifax (CA); Thomas Eaton, Halifax (CA); Danielle Leighton, Moncton (CA); Christoph Jan Sepp, Richmond (CA)

(73) Assignee: REEF GLOBAL IP LLC, Miami, FL (US)

( * ) Notice: Subject to any disclaimer, the term of this patent is extended or adjusted under 35 U.S.C. 154(b) by 319 days.

(21) Appl. No.: 16/779,530

(22) Filed: Jan. 31, 2020

(65) Prior Publication Data

US 2020/0175776 A1    Jun. 4, 2020

Related U.S. Application Data

(63) Continuation of application No. 15/015,527, filed on Feb. 4, 2016, now abandoned.

(30) Foreign Application Priority Data

Oct. 16, 2015 (CA) .................................. CA 2908762

(51) Int. Cl.
*G07B 15/04* (2006.01)
*H04W 4/02* (2018.01)
(Continued)

(52) U.S. Cl.
CPC ............. *G07B 15/04* (2013.01); *G06Q 10/02* (2013.01); *G06Q 20/322* (2013.01);
(Continued)

(58) Field of Classification Search
CPC .......... G07B 15/04; H04W 4/80; H04W 4/02; G06Q 10/02; G06Q 20/322; G06Q 20/3278
See application file for complete search history.

(56) References Cited

U.S. PATENT DOCUMENTS 3,849,936 A * 11/1974 Geraci .................. E01F 13/085
49/35
4,603,390 A    7/1986 Mehdipour et al.
(Continued)

FOREIGN PATENT DOCUMENTS

CA    2631914 A1    11/2008
JP    H11/39 522    2/1999
(Continued)

OTHER PUBLICATIONS

R. Lu, X. Lin, H. Zhu and X. Shen, "SPARK: A New VANET-Based Smart Parking Scheme for Large Parking Lots," IEEE Infocom 2009, 2009, pp. 1413-1421, doi: 10.1109/INFCOM.2009.5062057. (Year: 2009).*

(Continued)

*Primary Examiner* — Jeff Zimmerman
*Assistant Examiner* — Wayne S. Murray
(74) *Attorney, Agent, or Firm* — Sunstein LLP

(57) ABSTRACT

A computerized system for managing a parking lot includes: a beacon in one-way, or location sensor in two-way, communication with a smart device for locating the smart device without it having to determine its own location, a vehicle sensor for sensing the presence of a vehicle, and a computer-implemented server operable to determine from the beacon's (Continued)

identification or receive from the location sensor the location of the smart device. The server authorizes entry or exit of the vehicle when a smart device status indicates acceptance, and the smart device and the vehicle are both at a same appropriate location. The server updates the smart device status after a payment transaction. Entry or exit may be authorized by opening a barrier, displaying an authorization message, communicating a message to the smart device, and/or not issuing a non-authorization alert. The server may receive reservations, and may communicate lot occupancy to third-party systems.

36 Claims, 6 Drawing Sheets

(51) Int. Cl.
*H04W 4/80* (2018.01)
*G06Q 10/02* (2012.01)
*G06Q 20/32* (2012.01)

(52) U.S. Cl.
CPC ........ *G06Q 20/3278* (2013.01); *H04W 4/023* (2013.01); *H04W 4/80* (2018.02)

(56) References Cited

U.S. PATENT DOCUMENTS

| | | | |
|---|---|---|---|
| 5,266,947 A | 11/1993 | Fujiwara et al. | |
| 5,414,624 A | 5/1995 | Anthonyson | |
| 5,737,710 A | 4/1998 | Anthonyson | |
| 5,745,052 A | 4/1998 | Matsuyama et al. | |
| 6,249,233 B1 | 6/2001 | Rosenberg et al. | |
| 6,252,523 B1 | 6/2001 | Mostrom | |
| 6,340,935 B1 | 1/2002 | Hall | |
| RE37,822 E | 8/2002 | Anthonyson | |
| 6,501,391 B1 | 12/2002 | Racunas, Jr. | |
| 6,505,774 B1 | 1/2003 | Fulcher et al. | |
| 6,519,329 B1 | 2/2003 | Hjelmvik | |
| 6,577,248 B1 | 6/2003 | Hjelmvik | |
| 6,750,786 B1 | 6/2004 | Racunas, Jr. | |
| 6,850,153 B1 | 2/2005 | Murakami et al. | |
| 6,889,899 B2 | 5/2005 | Silberberg | |
| 6,937,139 B2 | 8/2005 | Nuesser et al. | |
| 7,014,109 B2 | 3/2006 | Hjelmvik | |
| 7,114,651 B2 | 10/2006 | Hjelmvik | |
| RE39,736 E | 7/2007 | Morrill, Jr. | |
| 7,319,974 B1 | 1/2008 | Brusseaux | |
| 7,430,411 B2 | 9/2008 | Sengupta et al. | |
| 7,474,233 B2 | 1/2009 | Ponert | |
| 7,539,500 B2 | 5/2009 | Chiang | |
| 7,714,742 B1 | 5/2010 | Noworolski et al. | |
| 8,026,832 B2 | 9/2011 | Weiss et al. | |
| 8,131,596 B2 | 3/2012 | McQuilken | |
| 8,145,568 B2 | 3/2012 | Rackley, III et al. | |
| 8,223,010 B2 | 7/2012 | Petite et al. | |
| 8,232,894 B2 | 7/2012 | Weiss et al. | |
| 8,325,063 B2 | 12/2012 | Dasgupta | |
| 8,334,792 B2 | 12/2012 | Kim | |
| RE44,467 E | 8/2013 | Morrill, Jr. | |
| 8,786,465 B2 | 7/2014 | Bouzaglo | |
| 8,830,322 B2* | 9/2014 | Nerayoff | G08G 1/144 348/148 |
| 8,923,827 B2 | 12/2014 | Wentker et al. | |
| 9,031,868 B2 | 5/2015 | Muirbrook | |
| 2004/0059693 A1 | 3/2004 | Hausen et al. | |
| 2004/0212518 A1 | 10/2004 | Tajima et al. | |
| 2005/0280555 A1 | 12/2005 | Warner, IV | |
| 2006/0094411 A1 | 5/2006 | Dupont | |
| 2007/0088624 A1* | 4/2007 | Vaughn | G06Q 30/02 705/26.81 |
| 2008/0291054 A1* | 11/2008 | Graft | G08G 1/14 340/932.2 |
| 2010/0168996 A1* | 7/2010 | Bourque | G06F 16/954 707/E17.108 |
| 2010/0191584 A1 | 7/2010 | Fraser et al. | |
| 2011/0213672 A1* | 9/2011 | Redmann | G07B 15/02 705/418 |
| 2012/0130775 A1 | 5/2012 | Bogaard et al. | |
| 2012/0265585 A1 | 10/2012 | Muirbrook et al. | |
| 2013/0046587 A1 | 2/2013 | Fraser et al. | |
| 2014/0214500 A1 | 7/2014 | Hudson et al. | |
| 2014/0232518 A1* | 8/2014 | Stoehr | G07B 15/04 340/5.6 |
| 2015/0066545 A1* | 3/2015 | Kotecha | G06Q 10/02 705/5 |
| 2015/0373482 A1 | 12/2015 | Barnard et al. | |
| 2016/0012726 A1* | 1/2016 | Wang | G08G 1/0129 340/932.2 |
| 2016/0042575 A1 | 2/2016 | Ganguly et al. | |
| 2016/0140846 A1* | 5/2016 | Outwater | G08G 1/144 340/932.2 |
| 2016/0217632 A1 | 7/2016 | Ille | |
| 2018/0061145 A1* | 3/2018 | Blustein | G07C 9/00309 |

FOREIGN PATENT DOCUMENTS

| | | |
|---|---|---|
| WO | WO 97/37328 A1 | 10/1997 |
| WO | WO 00/11616 A1 | 3/2000 |
| WO | WO 03/058562 A2 | 7/2003 |
| WO | WO 03/094118 A1 | 11/2003 |
| WO | WO 2004/070674 A2 | 8/2004 |
| WO | WO 2013/049259 A2 | 4/2013 |

OTHER PUBLICATIONS

English translation of foreign application—IL 238624, Parking Space Management System and Method, Tomer Blustein, Pink Park LTD, May 4, 2015.

\* cited by examiner

METHOD AND SYSTEM FOR MANAGING PARKING BY DUAL LOCATION VERIFICATION

CROSS-REFERENCE TO RELATED APPLICATIONS

The present application is a Continuation of U.S. patent application Ser. No. 15/015,527, filed Feb. 4, 2016, which claims priority to Canadian Patent Application No. 2908762, filed on Oct. 16, 2015, the entire contents of these applications are incorporated in the present application by reference.

BACKGROUND OF THE INVENTION

1. Field of Invention

This invention relates to the management of vehicle parking sessions and, in particular, to a method and system for managing parking by dual location verification.

2. Description of Related Art

Managing the parking of vehicles involves granting to selected vehicles access to parking stalls and receiving payment for parking from the vehicle operators.

In conventional parking management systems, human intervention is involved in many aspects of vehicle parking management.

Some automated parking systems reduce the amount of human intervention required, but do not eliminate the need for human intervention. For example, in controlled parking lots human intervention is often needed to operate an access gate to ensure payment is received for parking. In uncontrolled parking lots without a human-operated gate, human intervention is often needed to patrol the parking lot to locate instances of unpaid parking.

U.S. Pat. No. 8,131,596 to McQuilken discloses a method and system of payment for parking using a smart device and an in-vehicle display device for indicating parking payment status in a manner that is visible or can be scanned or sensed by parking enforcement personnel. The smart device is in wireless communication with the in-vehicle display device positioned for viewing or scanning by meter enforcement personnel. However, the in-vehicle display device must be obtained in advance by the vehicle owner and, once obtained, it is vulnerable to tampering, other damage, and theft.

United States patent application publication No. 2012/0130775 to Bogaard et al. discloses a method for processing a transaction for a parking session wherein the user facilitates the transaction through a mobile computing device of the user. However, the method of Bogaard et al. requires that the mobile computing device receive a parking identifier, such as by the user typing the parking identifier into the mobile computing device or otherwise in response to a user input action.

International publication No. WO2004/070674 to Kim discloses a parking control system using a mobile phone. However, the system of Kim requires that the parking person telephone a parking control server and input a parking position serial number indicative of a parking section position where his or her vehicle parks.

U.S. Pat. No. 7,319,974 to Brusseaux discloses a vehicle parking management method involving short-distance communication, such as by Bluetooth™ communication, between a mobile telephone of the user and a parking ticket machine. However, the method of Brusseaux requires that the user enter on his or her telephone a message including information about the user's identity and information concerning the parking time, and possibly information concerning the vehicle parking location and possibly information identifying the parked vehicle. When the user decides to vacate the parking space, the user must send a second telephone message to the ticket machine that includes information concerning the identification of the parked vehicle and the parking end time.

U.S. Pat. No. 7,114,651 to Hjelmvik discloses a method for control of parked vehicles in which a vehicle-specific code is tied to a user-specific code in a parking system computer. However, the method of Hjelmvik requires a parking attendant send a voice message to a telephone coupled to the parking system computer indicating a vehicle registration number.

U.S. Pat. No. 6,889,899 to Silberberg discloses a vehicle parking system. However, the system of Silberberg requires that the user dial a telephone number of a central control station computer and also input the user's account number and a number identifying a parking meter or other parking pay number.

An object of the invention is to address the above shortcomings.

SUMMARY

The above shortcomings may be addressed by providing, in accordance with one aspect of the invention, a computer-implemented method of managing a parking lot. The method involves: (a) authorizing an entry of a first vehicle by a computerized parking controller in response to a status indicating no entry rejection of a smart device, a first location indicating that the smart device is located at an entry location of the parking lot, and a first presence indicating that the first vehicle is present at the entry location, the first location being determined by the parking controller in response to an entry-beacon identification of an entry beacon of the parking lot, the entry-beacon identification being communicated to the parking controller by the smart device in a first communication; (b) determining by the parking controller an updated value of the status in response to a payment transaction associated with the smart device; and (c) authorizing an exit of a second vehicle by the parking controller in response to the status indicating no exit rejection of the smart device, a second location indicating that the smart device is located at an exit location of the parking lot, and a second presence indicating that the second vehicle is present at the exit location, the second location being determined by the parking controller in response to an exit-beacon identification of an exit beacon of the parking lot, the exit beacon being selected from the group consisting of the entry beacon and another beacon separate from the entry beacon, the exit-beacon identification being communicated to the parking controller by the smart device in a second communication, the exit location being selected from the group consisting of the entry location and another location separate from the entry location, the second vehicle being the first vehicle or another vehicle separate from the first vehicle.

Step (c) may involve determining by the parking controller whether the second vehicle is identified as the first vehicle. The parking lot may have an entry barrier for regulating entries at the entry location. Step (a) may involve opening the entry barrier by the parking controller so as to authorize the entry of the first vehicle. The parking lot may have an exit barrier for regulating exits at the exit location. Step (c) may involve opening the exit barrier by the parking controller so as to authorize the exit of the second vehicle. The exit barrier may be selected from the group consisting of the entry barrier and another barrier separate from the entry barrier. Step (a) may involve receiving by the parking controller the first communication generated by the smart device in response to the smart device receiving no more than a single user command entered into the smart device. Step (c) may involve receiving by the parking controller the second communication generated by the smart device in response to the smart device receiving no more than a single user command entered into the smart device. Step (a) may involve authorizing the entry of the first vehicle in response to an identification of the smart device selected from the group consisting of a telephone number, device identification code, licence plate number, an image of a licence plate, driver's licence number, an image of a driver's licence, officially-issued identification number, an image of an officially-issued identification certificate, a vehicle identification code, and a financial card number. Step (c) may involve authorizing the exit of the second vehicle in response to the status indicating that the smart device is registered with the parking controller and is in compliance with payment requirements of the parking controller. Step (a) may involve authorizing the entry of the first vehicle in response to the status indicating that the smart device is registered with the parking controller and is in compliance with payment requirements of the parking controller. The method may further involves determining by the parking controller a parking fee in response to a parking rate associated with the smart device. Determining by the parking controller a parking fee in response to a parking rate associated with the smart device may involve determining the parking fee in response to a duration of time spent parking. Determining the parking fee in response to a duration of time spent parking may involve determining the parking fee in response to the duration of time elapsed between when the parking controller authorizes the entry of the first vehicle and when the parking controller determines the second location. Step (a) may involve opening a stall barrier by the parking controller so as to authorize the entry of the first vehicle. The method may further involve opening a second entry barrier by the parking controller in response to the status indicating no second-entry rejection and to a third location determined by the parking controller, the third location indicating that the smart device is located in proximity to an entrance side of the second entry barrier. Opening a second entry barrier by the parking controller in response to the status indicating no second-entry rejection and to a third location determined by the parking controller, the third location indicating that the smart device is located in proximity to an entrance side of the second entry barrier, comprises opening a stall barrier. The method may further involve determining by the parking controller a parking fee in response to a parking rate associated with the smart device and a duration of time spent parking. Determining by the parking controller a parking fee in response to a parking rate associated with the smart device and a duration of time spent parking may involve determining the parking fee in response to the duration of time elapsed between when the parking controller determines an entry associated with the stall barrier and when the parking controller determines an exit associated with the stall barrier. The method may further involve communicating by the parking controller to at least one of the smart device and a computerized third-party system a notification generated by the parking controller in response to the parking controller authorizing the entry of the first vehicle, the notification indicating the entry of the first vehicle in association with the smart device. The method may further involve communicating by the parking controller to at least one of the smart device and a computerized third-party system a notification generated by the parking controller in response to the parking controller authorizing the exit of the second vehicle, the notification indicating the exit of the second vehicle in association with the smart device. The method may further involve communicating by the parking controller to at least one of the smart device and a computerized third-party system a notification generated by the parking controller in response to the second entry barrier being opened, the notification indicating the entry of the first vehicle in association with the smart device. The method may involve receiving by the parking controller a parking reservation request associated with the smart device and the parking lot. Receiving by the parking controller a parking reservation request associated with the smart device and the parking lot may involve receiving the parking reservation request from a computerized parking reservation system. The method may further involve determining by the parking controller a lot occupancy for the parking lot by maintaining a count of the difference between the number of authorized entries and authorized exits. The method may further involve communicating by the parking controller the lot occupancy to a third-party computerized system. Communicating by the parking controller the lot occupancy to a third-party computerized system may involve communicating to a computerized parking reservation system. The method may involve receiving by the parking controller from the computerized parking reservation system a parking reservation request associated with the smart device and the parking lot. The method may further involve closing the entry barrier by the parking controller in response to a third presence determined by the parking controller, the third presence indicating that the first vehicle is present at an interior side of the entry barrier. The method may further involve closing the exit barrier by the parking controller in response to a third presence determined by the parking controller, the third presence indicating that the second vehicle is present at an exterior side of the exit barrier. The method may further involve communicating by the server to the smart device parking lot information associated with the parking lot, the parking lot information including the location of the parking lot. The method may further involve communicating by the server to the smart device a notification of expiry of at least one of a parking session and a parking reservation. The method may further involve communicating by the server to a third-party computerized system a notification of expiry of at least one of a parking session and a parking reservation.

In accordance with another aspect of the invention, there is provided a computerized system for managing a parking lot. The system includes: (a) an entry beacon operable to transmit an entry-beacon identification of the entry beacon; (b) an exit beacon operable to transmit an exit-beacon identification of the exit beacon, the exit beacon being selected from the group consisting of the entry beacon and another beacon separate from the entry beacon; (c) a first vehicle sensor operable to sense the presence of a first vehicle at a vehicle entry location of the parking lot; (d) a second vehicle sensor operable to sense the presence of a second vehicle at a vehicle exit location of the parking lot, the second vehicle sensor being selected from the group consisting of the first vehicle sensor and another vehicle sensor separate from the first vehicle sensor, the exit location being selected from the group consisting of the entry location and another location separate from the entry location, the second vehicle being the first vehicle or another vehicle separate from the first vehicle; and (e) a computer-implemented server operable to receive from a smart device each of the entry-beacon identification and the exit-beacon identification, operable to determine the location of the smart device in response to said each of the entry-beacon identification and the exit-beacon identification, operable to determine a status associated with the smart device, operable to authorize an entry of the first vehicle when the status indicates no entry rejection of the smart device, the determined location of the smart device is at the entry location, and the first vehicle sensor senses the presence of the first vehicle at the entry location, operable to determine an updated value of the status in response to a payment transaction associated with the smart device, and operable to authorize an exit of a second vehicle when the status indicates no exit rejection of the smart device, the determined location of the smart device is at the exit location, and the second vehicle sensor senses that the second vehicle is at the exit location.

The parking lot may have an entry barrier for regulating entries at the entry location. The system may include an entry controller operable to open and close the entry barrier. The server may be operable to cause the entry controller to open the entry barrier when the server authorizes the entry of the first vehicle. The parking lot may have an exit barrier for regulating exits at the exit location. The system may include an exit controller operable to open and close the exit barrier. The server may be operable to cause the exit controller to open the exit barrier when the server authorizes the exit of the second vehicle. The exit barrier may be selected from the group consisting of the entry barrier and another barrier separate from the entry barrier. The exit controller may be selected from the group consisting of the entry controller and another controller separate from the entry controller. The server may be operable to determine a parking fee associated with the smart device in response to a duration of time spent parking.

In accordance with another aspect of the invention, there is provided a computerized system for managing a parking lot. The system includes: (a) means for authorizing an entry of a first vehicle in response to a status indicating no entry rejection of a smart device, a first location indicating the smart device is located at an entry location of the parking lot, and a first presence indicating that the first vehicle is present at the entry location; (b) means for determining an updated value of the status in response to a payment transaction associated with the smart device; and (c) means for authorizing an exit of a second vehicle in response to the status indicating no exit rejection of the smart device, a second location indicating that the smart device is located at an exit location of the parking lot, and a second presence indicating that the second vehicle is present at the exit location, the exit location being selected from the group consisting of the entry location and another location separate from the entry location, the second vehicle being the first vehicle or another vehicle separate from the first vehicle.

The system may include means for determining whether the second vehicle is the first vehicle.

In accordance with another aspect of the invention, there is provided a computer-implemented method of managing a parking lot. The method involves: (a) authorizing an entry of a first vehicle by a computerized parking controller in response to a status indicating no entry rejection of a smart device, a first location indicating that the smart device is located at an entry location of the parking lot, and a first presence indicating that the first vehicle is present at the entry location, the first location being determined by a location sensor of the parking controller, the location sensor being operable to determine the location of the smart device when the smart device is within a near-field range of the location sensor, the location sensor communicating the first location to a server of the parking controller; (b) determining by the parking controller an updated value of the status in response to a payment transaction associated with the smart device; and (c) authorizing an exit of a second vehicle by the parking controller in response to the status indicating no exit rejection of the smart device, a second location indicating that the smart device is located at an exit location of the parking lot, and a second presence indicating that the second vehicle is present at the exit location, the second location being determined by the location sensor, the location sensor communicating the second location to the server, the exit location being selected from the group consisting of the entry location and another location separate from the entry location, the second vehicle being the first vehicle or another vehicle separate from the first vehicle.

Step (a) may involve determining by the location sensor the first location by trilateration of at least one first communication between the smart device and a plurality of wireless communication devices of the location sensor disposed at the parking lot. Step (c) may involve determining by the location sensor the second location by trilateration of at least one second communication between the smart device and the plurality of wireless communication devices. Step (a) may involve effecting the at least one first communication by near-field wireless communications. Step (c) may involve effecting the at least one second communication by near-field wireless communications. Step (a) may involve determining by the location sensor the first location by proximity sensing the smart device by a first proximity sensor of the location sensor disposed at the parking lot. Step (c) may involve determining by the location sensor the second location by proximity sensing the smart device by a second proximity sensor of the location sensor disposed at the parking lot. The second proximity sensor may be selected from the group consisting of the first proximity sensor and another proximity sensor separate from the first proximity sensor. Step (a) may involve determining by the location sensor the first location by establishing near-field communication between the smart device and a first NFC device of the location sensor disposed at the parking lot. Step (c) may involve determining by the location sensor the second location by establishing near-field communication between the smart device and a second NFC device of the location sensor disposed at the parking lot. The second NFC device may be selected from the group consisting of the first NFC device and another NFC device separate from the first NFC device.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

A computerized system for managing a parking lot includes: (a) means for authorizing an entry of a first vehicle in response to a status indicating no entry rejection of a smart device, a first location indicating the smart device is located at an entry location of the parking lot, and a first presence indicating that the first vehicle is present at the entry location; (b) means for determining an updated value of the status in response to a payment transaction associated with the smart device; and (c) means for authorizing an exit of a second vehicle in response to the status indicating no exit rejection of the smart device, a second location indicating that the smart device is located at an exit location of the parking lot, and a second presence indicating that the second vehicle is present at the exit location, the exit location being selected from the group consisting of the entry location and another location separate from the entry location, the second vehicle being the first vehicle or another vehicle separate from the first vehicle. The system may include means for determining whether the second vehicle is the first vehicle.

Figure 1:
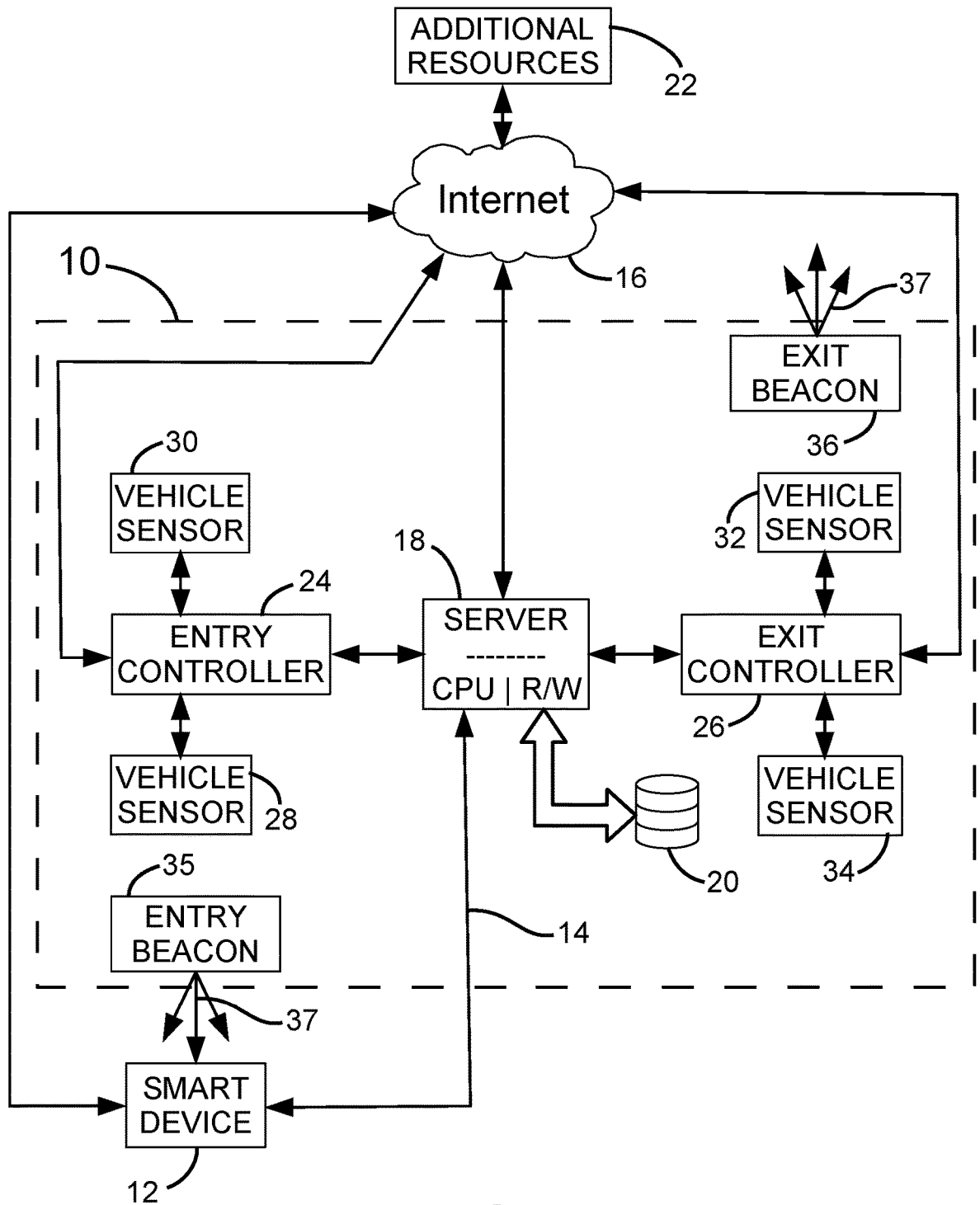
FIG. 1 is a block diagram of a computerized system for managing a parking lot according to a first embodiment of the invention.

Referring to FIG. 1, the system according to a first embodiment of the invention is shown generally bounded within a dotted-line rectangle at 10.

The system 10 is operable to manage a parking lot (not shown) typically, but not necessarily, having an entry barrier such as an entrance gate (not shown) and an exit barrier such as an exit gate (not shown), and as such the system 10 may be referred to as a computerized parking controller. The entrance gate or other entry barrier, if present, defines an entry lane (not shown) leading up to the entrance gate. The portion of the entry lane that is on the exterior side of the entrance gate may be part of the parking lot, a public alley or other roadway, a private driveway, a similar access lane, or any combination thereof, for example. Typically, at least one entrance gate is located along the outer perimeter of the parking lot such that the portion of the entry lane that is on the interior side of the entrance gate is inside the parking lot. The entry lane on the interior side of the entrance gate ordinarily proceeds from the entrance gate to provide access to any number of parking stalls (not shown) of the parking lot. The parking stalls may be marked (e.g. by painted lines, such as on asphalt or concrete, signposts, signs, etc.) or may be unmarked (e.g. in the case of a gravel or grass parking lot), for example.

Similarly, the exit gate or other exit barrier, if present, defines an exit lane (not shown) leading up to the exit gate. The portion of the exit lane that is on the interior side of the exit gate forms part of the parking lot between the parking stalls and the exit gate. Typically, at least one exit gate is located along the outer perimeter of the parking lot, such that the portion of the gated exit lane that is on the exterior side of the exit gate is outside of the parking lot. The gated exit lane on the exterior side of the exit gate ordinarily proceeds from the exit gate away from the parking lot and connects to public roadways or the like.

Typically, the entrance and exit gates are adjacent to each other such that the entry lane and the exit lane on both the interior and exterior sides of their respectively associated gates are adjacent to each other and not overlapping with each other. However, in some embodiments the exit and entrance gates are adjacent, non-overlapping portions of a single, larger gate (e.g. a roll gate spanning the entry and exit lanes). In such embodiments, the entrance gate and the exit gate open and close simultaneously. For example, the entrance and exit gates may be integrally connected to each other to form the single gate.

In some embodiments, the entry and exit lanes coincide with each other to form a single entry-and-exit lane. In such embodiments, the entrance gate and the exit gate are typically integrally connected to each other to form a single gate, which would ordinarily span the single entry-and-exit lane.

In general, any suitable barrier or barriers for regulating entries into and exits from the parking lot may be employed. A barrier may be implemented by any suitable type of gate such as a rotating gate, horizontally sliding gate, roll gate, etc.; any suitable type of blockade such as spikes, posts, beams, etc.; any suitable type of spanning catenary such as a chain, wire, cable, rope, ribbon, etc.; and any suitable type of indicator such as a red/green light, audible command, text and/or graphic display, etc.; any suitable message communicated to a vehicle or its driver, such as an automated voice message, text message, message displayable at a mobile telephone by a software application installed therein, etc.; or any combination thereof for example. By way of further example, a proximity sensor, beam (e.g. infra-red beam) detection system, or other detection means in combination with an indicator (e.g. electronic display), messaging system, etc., may act as a barrier for example. The barrier may be any one or more of an entry barrier, exit barrier, and integrally connected single barrier, for example.

In some embodiments, there is one stall barrier at each parking stall among all or a portion of the parking stalls in the parking lot. In such embodiments, one entry barrier and one exit barrier are integrally connected and overlapping to form each single stall barrier. Stall barriers may be employed in addition or alternatively to entry and exit barriers at the outer perimeter of the parking lot. In some embodiments and parking lots, the stall barrier(s) associated with each given stall are the only entry and exit barriers of the parking lot.

Stall barriers are typically implemented by a moveable post or other item that is "opened" by retracting, rotating or otherwise moving the post away from its obstruction position in order to permit parking in the stall, remains "open" during the entire time that the vehicle is parked in the stall, and is typically "closed" after the vehicle has vacated the parking stall by moving the stall barrier back into its obstruction position to prevent further parking in the stall until the stall barrier is re-opened. The opening and closing movements of the stall barrier are automated under computerized control by the system 10. In general, any suitable type of barrier may be employed at a restricted parking stall, such as a red/green light, electronic display or other indicator, messaging system, other barrier, and any combination thereof for example. By way of further example, a proximity sensor, beam (e.g. infra-red beam) detection system, or other detection means in combination with an indicator (e.g. electronic display), messaging system, etc., may act as a stall barrier.

In some embodiments, there is a plurality of entry and exit barriers such as entrance and exit gates. For example, some parking lots have one entry barrier adjacent one exit barrier at each of a plurality of access points along the outer perimeter of the parking lot. Additionally or alternatively, inside the parking lot there may be an interior entry barrier adjacent an interior exit barrier for access to a restricted section of the parking lot. In some embodiments, there is a plurality of interior entry and exit barriers defining a plurality of restricted sections of the parking lot. Each restricted section may be of any suitable size ranging from a single parking stall to every stall in the parking lot. Interior barriers may be employed in addition or alternatively to each of the outer perimeter barriers and employed in addition or alternatively to any number of stall barriers. In the description herein, the exterior side of an interior entry or exit barrier is typically the side of the given interior barrier closer to the outer perimeter of the parking lot, and the interior side of an interior entry or exit barrier is intended to mean the side to which access is restricted by the given interior barrier.

In general, any combination of any number of outer perimeter barriers, any number of interior barriers, and any number of stall barriers is within the scope contemplated by the present invention. If there are zero outer perimeter barriers, zero interior barriers, and zero stall barriers, then the parking lot is an unrestricted-access parking lot.

Referring to FIG. 1, the system 10 is operable to communicate with a smart device 12. The smart device 12 can be any communications device operable to send and receive communications, including telephone communications via a telephone network (not shown), data communications such as machine-to-machine communications, other wireless or wired communications, and any combination thereof for example. The smart device 12 is typically a mobile telephone, but in variations may be any general purpose computer device, laptop computer, tablet computer, personal communication device, wearable technology device, automobile or other transportation vehicle (e.g. having installed therein communications equipment), similar computational device, or any combination thereof for example. A smart device that is integrated into a vehicle may be referred to as a smart vehicle. Communications between the system 10 and the smart device 12 may be conducted directly, such as via the direct link 14 shown in FIG. 1, or indirectly, such as via a telecommunications network, LAN (local-area network), WAN (wide-area network), and/or a global communications network like the Internet 16 shown in FIG. 1. In the first embodiment, the system 10 and the smart device 12 ordinarily communicate with each other via the direct link 14 by near-field wireless communications (e.g. Bluetooth™ standard communications, NFC (Near-Field Communications) standard communications, etc.), but are operable to communicate via the Internet 16 as a backup method in case of failure to communicate via the direct link 14. In some embodiments, however, communications between the server 10 and the smart device 12 are conducted only via the direct link 14. In some embodiments, communications between the server 10 and the smart device 12 are conducted only indirectly, such as via the Internet 16. Communication via an indirect link may be implemented using any suitable telephone or other communications technology, for example. In general, communications between the system 10 and the smart device 12 may be transmitted via any wired or wireless connection, including a copper wire link, a coaxial cable link, a fiber-optic transmission link, a radio link, a cellular telephone link, a satellite link, a line-of-sight free-optics link, and any combination thereof for example.

The system 10 includes a server 18, which may be any computing device(s) such as a general purpose computer, microcomputer, minicomputer, mainframe computer, distributed network for computing, functionally equivalent discrete hardware components, etc., and any combination thereof for example. In the first embodiment, the server 18 includes a processing circuit, such as a CPU (Central Processing Unit), for performing programmable digital computations and a non-transitory Read/Write memory for storing digital data. The Read/Write memory of the server 18 may include any combination of volatile memory, such as RAM (Random Access Memory), and non-volatile memory, such as flash memory, universal serial bus (USB) connected memory units, magnetic storage, optical storage, magneto-optical storage, etc., and any combination thereof for example. The Read/Write memory of the server 18 typically includes data storage circuitry operable to store program code for directing operations of the processing circuit of the server 18.

In the first embodiment shown in FIG. 1, the server 18 is connected to a non-transitory database 20 for data storage. While FIG. 1 shows the server 18 and the database 20 as being separate from each other, in some embodiments the database 20 forms an integral part of the Read/Write memory of the server 18. Additionally or alternatively to storing data in the database 20, the server 18 in the first embodiment is operable to store data via the Internet 16 using the Internet-connected additional resources 22.

Still referring to FIG. 1, the system 10 in the first embodiment includes an entry controller 24 for controlling the entry barrier (not shown) and an exit controller 26 for controlling the exit barrier (not shown). In the first embodiment, the entry controller 24 and the exit controller 26 are operable to open and close the entry and exit barriers, respectively, including in some embodiments being operable to open and/or close the barrier(s) in response to commands received from the server 18. The controller 24 and 26 may be motor controllers, for example.

In embodiments where the entry and exit barriers are integrally connected to each other to form a single barrier, such as a roll gate or a stall barrier, a single controller 24 or 26 may be suitably employed for the single barrier.

Embodiments having a plurality of entry barriers and a plurality of exit barriers, such as for parking lots having a plurality of restricted sections, typically include a corresponding plurality of entry controllers 24 and a corresponding plurality of exit controllers 26, respectively. In some embodiments, however, a single controller 24 or 26 may be operable to control a plurality of entry and/or exit barriers.

Each of the entry and exit controllers 24 and 26 are operable to communicate with the server 18 by any suitable technique, such as by a direct link as shown in FIG. 1 and/or via the Internet 16 as also shown in FIG. 1.

Typically, the entry controller 24, the exit controller 26, both of the entry and exit controllers 24 and 26, or a single controller 24 or 26 includes a non-transitory memory for storing data, such as measurement values and/or program code, and includes processing circuitry, such as a CPU, for performing digital computations. In some embodiments (not shown), one or both of the entry controller 24 and the exit controller 26 form part of the server 18 such that the server 18 is operable to directly control one or both of the entry barrier(s) and the exit barrier(s), respectively. While not shown in FIG. 1, in some embodiments some or all of the server 18 functions are performed by at least one of the entry controller 24, exit controller 26 and single controller, for example such that the server 18 shown in FIG. 1 forms part of the controller(s) 24 or 26.

The system 10 shown in FIG. 1 includes vehicle sensors 28, 30, 32 and 34, each of which is operable to determine whether a vehicle is present at a particular location associated with the parking lot such as at the exterior or interior side of the entrance gate or other entry barrier (not shown) or at the interior or exterior side of the exit gate or other exit barrier (not shown), for example. In the first embodiment shown in FIG. 1, the vehicle sensor 28 is operable to sense the presence or absence of a vehicle at a vehicle entry location, which for typical parking lots is commonly defined as being in the entry lane adjacent to and on the exterior side of the entry barrier. The vehicle sensor 28 in the first embodiment is also operable to permit detection of the presence or absence by at least one of the entry controller 24 and the server 18. The vehicle sensor 30 is operable to sense the presence or absence of a vehicle in the entry lane adjacent to and on the interior side of the entry barrier, and is operable to permit detection of the presence or absence by at least one of the entry controller 24 and the server 18. The vehicle sensor 32 is operable to sense the presence or absence of any vehicle at a vehicle exit location, which for typical parking lots is commonly defined as being in the exit lane adjacent to and on the interior side of the exit barrier. The vehicle sensor 32 in the first embodiment is also operable to permit detection of the presence or absence by at least one of the exit controller 26 and the server 18. Also, the vehicle sensor 34 is operable to sense the presence or absence of a vehicle in the exit lane adjacent to and on the exterior side of the exit barrier, and is operable to permit detection of the presence or absence by at least one of the exit controller 26 and the server 18. In the context of the exit barrier, any vehicle refers to either the particular vehicle also sensed adjacent the entry barrier or another vehicle different from that particular vehicle.

FIG. 1 shows two vehicle sensors 28 and 30 in communication with the entry controller 24 and two other vehicle sensors 32 and 34 in communication with the exit controller 26. Additionally or alternatively, in some embodiments one or more vehicle sensors are operable to communicate with the server 18, such as by communicating directly (e.g. direct link 14) by wired or wireless communications for example or indirectly via a LAN, WAN, other communications link, the Internet 16 or any combination thereof for example. In some embodiments, one or more of the vehicle sensors 28 to 34 form part of the server 18 such that the server 18 is operable to directly sense the presence or absence of a vehicle at specifiable location(s).

In some embodiments, one or more server 18 functions are distributed among one or more of the server 18, entry controller 24, exit controller 26, and one or more of the vehicle sensors 28 to 34 in any combination for example. In a distributed server architecture, communications between distributed server 18 components may be implemented in any suitable manner, and may involve two-way communications for example.

In the first embodiment, on the basis of an indication of presence or absence sensed by the vehicle sensor 28, the system 10 is operable to determine whether a vehicle is present at the entrance gate, other entry barrier, or otherwise in a position to enter into the parking lot, restricted section or parking stall. Also, on the basis of an indication of presence or absence sensed by the vehicle sensor 30, the system 10 is operable to determine whether a vehicle is present at the interior side adjacent the entry barrier, such as after entering the parking lot by passing by the opened entry barrier. Similarly, the system 10 is operable to determine whether a vehicle is present at the exit gate, other exit barrier, or otherwise in a position to exit the parking lot, restricted section or parking stall on the basis of an indication of presence or absence sensed by the vehicle sensor 32. While a vehicle being in a position to exit the parking lot or restricted section thereof may be sensed by the presence of the vehicle at a vehicle exit location, the vehicle exiting a parking stall may be sensed by the change from presence to absence at the parking stall, for example. Additionally, on the basis of an indication of presence or absence sensed by the vehicle sensor 34, the system 10 is operable to determine whether a vehicle is present at the exterior side adjacent the exit barrier, such as after exiting the parking lot by passing by the opened exit barrier. In general, any number of vehicle sensors may be employed at any suitable location(s) within or surrounding the parking lot. For example, one or more vehicle sensors may be employed at a given parking stall, including having one vehicle sensor positioned at the given parking stall itself and/or one or more vehicle sensors positioned adjacent the given parking stall along one or more access routes to and from the given parking stall, respectively.

In some embodiments, the server 18 in conjunction with the one or more vehicle sensors associated with a given parking stall implement a stall barrier and its associated entry and/or exit controller(s) 24 and 26, as further described herein below.

Typically, each vehicle sensor 28 to 34 is implemented as an inductive sensor positioned underground at its desired location. Such inductive sensor may include loops of wire having a loop size commensurate with that of a typical vehicle, in a manner known in the art. However, other vehicle sensing technologies are possible. Some examples include visual detection by computerized image analysis of video data; infrared sensing; sonar/radar detection; the breaking of a laser or other beam; mechanical detection such as by ground-level pressure sensors, ground-level switches, above-ground switches for making contact as a vehicle passes by, other mechanical sensors; chemical detection; other analogous detection techniques; and any combination thereof for example.

Still referring to FIG. 1, the system 10 in the first embodiment is operable to determine the location of the smart device 12 when the smart device 12 is in the vicinity of at least one of the entry barrier, exit barrier and single, combined barrier. In some embodiments, the system 10 is operable to determine the location of the smart device 12 whenever it is located at the parking lot, including in some cases being anywhere within the parking lot.

In the first embodiment, the system 10 includes one or more location beacons such as the entry beacon 35 and the exit beacon 36 shown in FIG. 1. Each beacon 35 and 36 is operable to broadcast a wireless signal 37 that can be received by the smart device 12 when the smart device 12 is located within the broadcast range of the beacon 35 and/or 36. Typically, the beacons 35 and 36 are operable to broadcast their wireless signals 37 in accordance with a near-field wireless communications standard such as Bluetooth™, NFC (Near-Field Communications), similar communications standard, and any combination thereof for example. The beacons 35 and 36 broadcast their wireless signals 37 within a limited range that is in some embodiments adjustable according to desired preferences. Any number of entry beacons 35 and any number of exit beacons 36 may be employed in any combination. By way of example only, a first entry beacon 35 may be deployed outside the parking lot in the vicinity of the entry barrier, a second entry beacon 35 may be deployed at the entry lane adjacent to and on the exterior side of the entry barrier, and a third entry beacon 35 may be deployed at the entry lane adjacent to and on the interior side of the entry barrier, for example. Similarly, a first exit beacon 36 may be deployed inside the parking lot in the vicinity of the exit barrier, a second exit beacon 36 may be deployed at the exit lane adjacent to and on the interior side of the exit barrier, and a third exit beacon 36 may be deployed at the exit lane adjacent to and on the exterior side of the exit barrier, for example.

In the first embodiment, the wireless signal 37 includes an identification code identifying the particular beacon that is broadcasting that wireless signal 37. For example, the entry beacon 35 may broadcast its identification as the code "35" while the exit beacon 36 may broadcast its identification as the code "36".

In the first embodiment, the smart device 12 has installed therein a software application program that is compatible with the system 10. The smart device 12 application renders the smart device 12 operable to receive the wireless signals 37 from a given beacon 35 or 36; parse from the received wireless signal 37 the identification code associated with the given beacon 35 or 36; determine on the basis of signal characteristics (e.g. propagation time and/or signal 37 strength decay) the distance between the smart device 12 and the given beacon 36 or 37; and communicate to the server 18 the received identification code, determined distance, and an identification of the smart device 12. In the first embodiment, the server 18 is operable to receive the communication from the smart device 12; parse from the communication the beacon identification, associated distance, and smart device 12 identification; determine the location of the given beacon 35 or 36 in response to the beacon identification (such as by lookup table); and thereby determine a current location associated with the identified smart device 12. Where the smart device 12 receives multiple broadcasts from multiple beacons 35 and/or 36 and the smart device 12 is operable to determine the distance between itself and each of the multiple beacons 35 and/or 36, the server 18 in some embodiments is operable to determine by known trilateration techniques a more accurate determination of the smart device 12 location. While in the first embodiment, the smart device 12 is operable to determine the distance between the smart device 12 and the given beacon 35 or 36, in a variation the smart device 12 does not determine its distance from given beacon 35 and only communicates to the server 18 the received identification code and the smart device 12 identification, such that the server 18 is operable to determine the location of the smart device 12 within an accuracy commensurate with the wireless range of the given beacon 35 or 36. In all such variations, the system 10 is advantageously operable to determine the current location of the smart device 12 without requiring that the smart device 12 itself determine its own current location and without requiring that the smart device 12 determine or otherwise obtain the location of any beacon 35 or 36.

In some embodiments, one or more location sensors are implemented as enhanced variations of the beacons 35 and 36. In some instances, such location sensors are operable to perform two-way wireless communications with the smart device 12. In such embodiments, the smart device 12 and the location sensor typically communicate via near-field wireless communications, such as by Bluetooth™ standard communications, NFC (Near-Field Communications, similar communications standard, any combination thereof for example. In such embodiments, the location sensor may include three or more wireless communications devices (not shown) spaced apart from each other that, together, are operable to determine the location of the smart device 12 by trilateration of one or more communications transmitted between the smart device 12 and the different wireless communications devices. In variations of such embodiments, the location sensor may include one or more sets of wireless communications devices such that each set is operable to determine the location of the smart device 12 when it is in the vicinity of one entry barrier, in the vicinity of one exit barrier, in the vicinity of a pair of entry and exit barriers, or in the vicinity of a plurality of entry and/or exit barriers. In some embodiments at some or all parking lots, the location sensor is operable to determine the location of the smart device 12 whenever it is in the vicinity of the parking lot. Such wireless communications devices can be near-field wireless communications devices, for example.

In some embodiments, each wireless communications device of the location sensor includes a non-transitory memory for storing data, such as measurement data and/or program data, and includes processing circuitry, such as a CPU, for performing digital computations.

In some embodiments in which the location sensor is implemented as an enhanced variation of the beacons 35 and 36, the location sensor includes a number of proximity sensors (not shown) disposed at the parking lot. For example, one proximity sensor may be disposed at the entry lane on the exterior side of the entry barrier, and another proximity sensor may be disposed at the exit lane on the interior side of the exit barrier. In use, the smart device 12 may be held in sufficiently close proximity to a given proximity sensor for the given proximity sensor to register the location of the smart device 12, such as while the smart device 12 is in communication with the server 18 so as to facilitate the server 18 in associating the smart device 12 identification with proximity sensing of the smart device 12 to determine its location.

In some embodiments in which the location sensor is implemented as an enhanced variation of the beacons 35 and 36, the location sensor includes a number of NFC (Near-Field Communication) devices (not shown) disposed at the parking lot. For example, one NFC device may be disposed at the entry lane on the exterior side of the entry barrier, and another NFC device may be disposed at the exit lane on the interior side of the exit barrier. In use, the smart device 12 may be held in sufficiently close proximity to a given NFC device for the given NFC device to establish near field communications with the smart device 12 (e.g. under control of the application program installed therein in accordance with the present invention) so as to allow the NFC device to receive the smart device 12 identification and also determine the location of the smart device as being proximate to the given NFC device.

Other technology for implementing the location sensor is possible, and any suitable location sensor or combination of location sensors may be employed to determine the location of the smart device 12 without requiring that the smart device 12 determine its own location.

The location sensor in some such embodiments is operable to communicate via any suitable communications technology with the server 18. Additionally or alternatively, such as possibly in the manner of an optional backup method, the location sensor in some embodiments is operable to communicate via any suitable communications technology with the entry and exit controllers 24 and 26, which in turn are operable to communicate with the server 18. Other communications schemes are possible for any given location sensor.

In some embodiments, one or more location sensors, or any wireless communications device thereof, forms part of the server 18 such that the server 18 is operable to directly communicate with the smart device 12 to determine the identification and/or location of the smart device 12. In some embodiments, the server 18 is operable to perform the operations of one or more near-field wireless communications devices, proximity sensors, and/or NFC devices of such location sensors. The server 18 implements any suitable rules regarding the boundaries within which the smart device 12 must be located to be considered at an entry or exit location and the boundaries within which a vehicle must be located to be considered at the same entry or exit location, respectively. In many cases, a smart device 12 will be inside a vehicle that is present at an entry or exit location. However, this need not always be the case and the boundaries of the entry and exit locations may exceed those of the vehicle entry and vehicle exit locations, respectively, for example. Typically, the defined vehicle entry and vehicle exit locations at least overlap with their associated entry and exit locations, respectively, and may lie entirely within the boundaries of their associated entry and exit locations, respectively, for example.

Exemplary Signal Timeline

Figure 2:
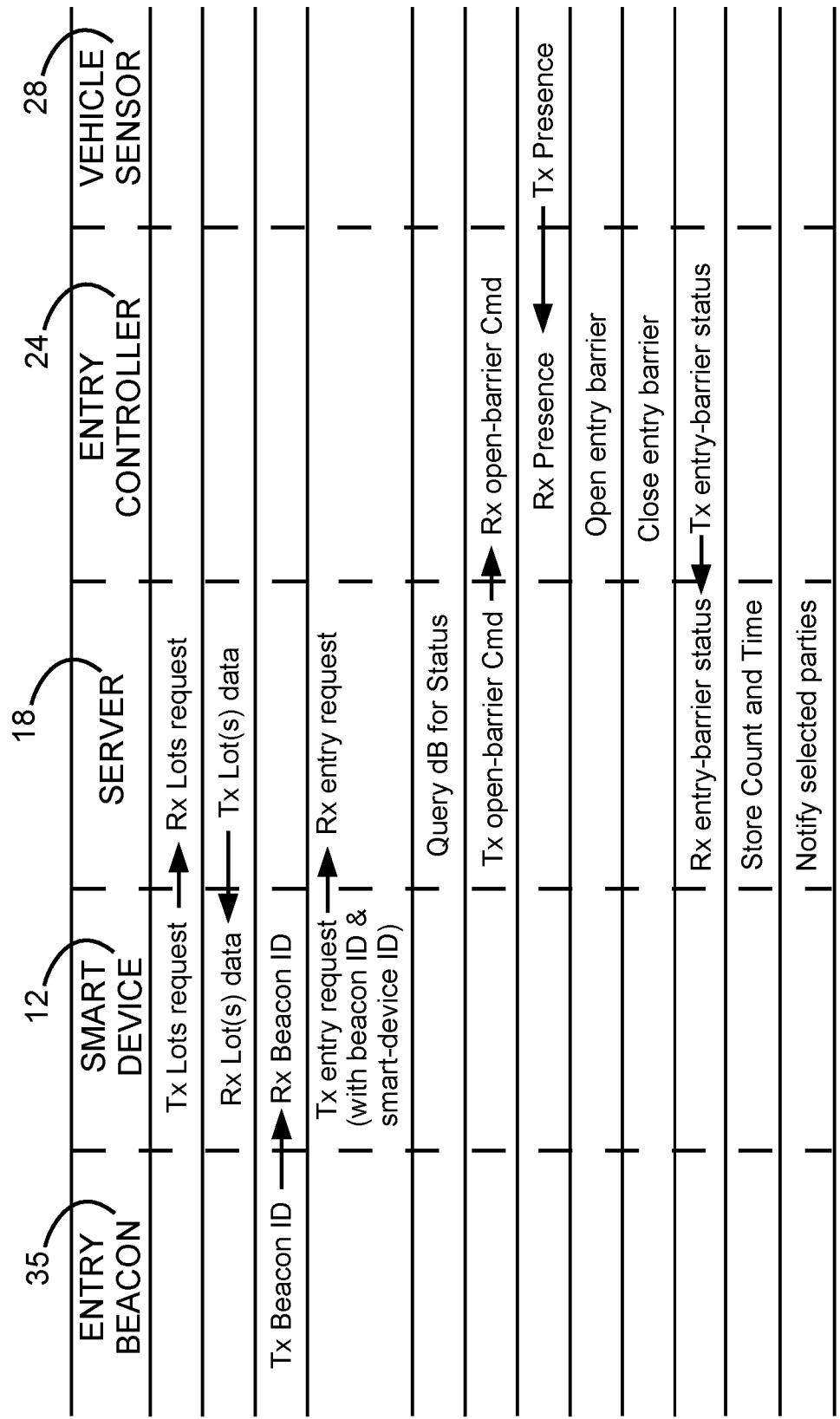
FIG. 2 is a signal timeline chart for the system shown in FIG. 1, showing the communication of messages between system components including an entry controller.

Referring to FIGS. 1 and 2, a typical exemplary parking scenario involving the first embodiment of the invention begins with the smart device 12 optionally communicating a request for parking lot information to the server 18, which receives the parking lot information request. The server 18 is typically operable to obtain, such as by retrieving from the database 20, information concerning each parking lot where a person may park their vehicle in accordance with embodiments of the invention. For each such parking lot, its associated information may include the location (e.g. street address) of the parking lot, parking lot hours of operation, pricing information, payment information, special event parking information, instructions or other guidance for making parking reservations at the parking lot, parking lot rules of conduct, other related information or any combination thereof, for example. In cases where the present invention has been implemented in multiple parking lots in a given city, country or around the world, the server 18 may be operable to use the location of the smart device 12 to provide parking lot information that is geographically close to the current location of the smart device 12. Additionally or alternatively, the server 18 may communicate all available parking lot information, in which case the smart device 12 may be operable to filter the received information based on defined relevance to the smart device 12 user. Typically, the smart device 12 does not need to be in the vicinity of a suitable parking lot to request or receive the parking lot information; and the communications between the smart device 12 and the server 18 related to the parking lot information can be implemented by any suitable techniques, such as ordinary mobile telephone communications techniques for example.

After the server 18 has communicated the parking lot information to the requesting smart device 12, the smart device 12 presents the information, or a subset thereof, to the user, such as by displaying a street map with suitable parking lots marked thereon. In some embodiments, the smart device 12 is operable to provide driving directions from the current location of the smart device 12 to a selected parking lot. Typically, the smart device 12 requests the parking lot information in response to user input (e.g. requesting a map display). Also, current parking lot information may be included with an initial download from the server 18 of the smart device 12 application, for example. Updated parking lot information may be provided at each user request of the parking lot information, by automatic or manually selected downloads of updates, or any combination thereof for example.

In some embodiments, the parking lot information is not available, or is optionally provided. Additionally or alternatively, the map display feature may not be available to every smart device 12 in all embodiments, or may be optionally provided.

In the first embodiment, the entry beacon 35 broadcasts its entry identification code. When the smart device 12 arrives in the vicinity of the parking lot where it is within the wireless range of the entry beacon 35, the smart device receives the entry beacon identification and is operable to communicate an entry request to the server 18. In the first embodiment, the entry request contains the entry beacon 35 identification and also identifies the requesting smart device 12 in a manner associated with the entry beacon 35 identification.

In variations, user input may or may not be required to generate the entry request. For example, the smart device 12 application typically allows the smart device 12 user to pre-register with the system 10 to provide persistent or recurring information such as personal information, payment preferences, and the like. In this manner, the smart device 12 is operable to generate the entry request without re-entry of such persistent information each time the smart device 12 user wishes to park their vehicle (not shown). For example, the smart device 12 application can be programmed to present to the smart device 12 user a single "OK" or "ENTER" button to be pressed when the smart device 12 is in the vicinity of the parking lot. The "OK" or "ENTER" button may be a soft button displayed on a touchscreen, a keypad hard button, or other button of the smart device 12 for example. When the "OK" or "ENTER" button is pressed by the smart device 12 user when the smart device 12 is in the vicinity of the parking lot and its entry beacon 35, then the smart device 12 generates the entry request in response to user input consisting solely of no more than the single press of the "OK" or "ENTER" button. In general, any suitable form of user input may be employed as a user command, such as a voice command, biometric input such as a fingerprint reading, a visually detectable user gesture, other user input, or any combination thereof for example. Accordingly, in some embodiments the entry request is generated by the smart device in response to the smart device receiving no more than a single user command. In some embodiments, the smart device 12 application may be programmed to automatically transmit the entry request, absent any user input, whenever the smart device 12 determines that it is in the vicinity of the parking lot, such as by receiving the entry beacon identification for example.

In some embodiments, pre-registration with the system 10 may be fully or partly completed online via a website associated with the system 10, for example.

In the first embodiment, the entry request generated by the smart device 12 includes an identification of the smart device 12, such as by including the mobile telephone number of the smart device 12. In general, the smart device 12 and/or its user may be identified or otherwise associated with each other in any suitable manner, such that the smart device 12 identification may be or include a hardware device identification of the smart device 12; a software identification associated with installed software of the smart device 12; a telephone number associated with the smart device 12; an Internet protocol address, URL (Uniform Resource Locator) or other communications identification associated with the smart device 12; a user identification such as a user name; an officially issued user identification such as a birth certificate number, social insurance or welfare number, government ID, etc.; an image of an officially issued identification certificate; driver's licence number; a vehicle licence plate number; an image of a licence plate; a vehicle registration number; a vehicle identification number (VIN) or other vehicle identification code, such as in the case of a smart vehicle for example; a financial card number such as a credit or debit card number; other related identification; or any combination thereof for example. Additionally or alternatively, the identification of the smart device 12 can be transmitted from the smart device 12 to the server 18 in a separate communication from the entry request. Other communications between the smart device 12 and the server 18 are possible and are within the scope contemplated by the present invention, such as further user input prompts for example. In some embodiments, the server 18 is operable to query an additional resource 22 to obtain and/or verify the smart device 12 identification.

While FIG. 2 shows an exemplary scenario involving the first embodiment having beacons 35 and 36, in some embodiments a given parking lot may include one or more location sensors (implemented as enhanced variations of the beacons 35 and 36) operable to determine the location of the smart device 12, such as in response to two-way communications between the smart device 12 and the location sensor(s). For example, the location sensor(s) may be operable to calculate the location of the smart device 12 by trilateration of communications between the smart device 12 and wireless communications devices (not shown) of the location sensor(s). In such embodiments, the smart device 12 may transmit to the location sensor(s) an entry request containing the smart device 12 identification. Thereafter, the location sensor(s) determine the location of the smart device 12, and then transmit the smart device 12 identification and the smart device 12 location to the server 18, or to the entry controller 24 which forwards them to the server 12. Additionally or alternatively, the location sensor(s) and/or entry controller 24 may include server 18 functionality such that the location sensor(s) and/or entry controller 24 further process the smart device 12 identification and smart device 12 location.

Using the smart device 12 identification, the server 18 queries the database 20 for the current status associated with that smart device 12 identification, and retrieves the current status from the database 20. In the exemplary scenario of FIG. 2, the status is based on information associated with the smart device 12 identification, such as pre-registration information previously provided by the smart device 12 user when opening a user account with the system 10 and any subsequent updates thereto.

For the scenario in which the smart device 12 is not pre-registered with the system 10 and no status exists in the database 20 in association with the smart device 12 identification, the system 10 will reject entry in some embodiments such that the entry barrier does not open. Alternatively, in some embodiments the system 10 permits entry to an unidentified smart device 12 and continues communicating with the smart device 12 to obtain the necessary information for registering the smart device 12 and/or processing a parking payment after entry. Similarly, in some embodiments the system 10 rejects entry if the status indicates that the smart device 12 is not in compliance with payment requirements of the system 10, such as by being in arrears regarding previous parking fees, while in some embodiments the system 10 permits entry even if the smart device 12 identification is associated with payment arrears. Additionally or alternatively, the system 10 in some embodiments issues an alert to a human attendant who can arrive at the location to assist. In the context of rejecting entry, other alerts that are issued by the system 10 in variations of embodiments include alerts to the smart device 12 user, alerts to humans in a call center or other establishment of the parking lot business, and alerts to initiate parking enforcement against the vehicle associated with the smart device 12 and/or against the smart device 12 user, for example.

In some embodiments, parking reservations are offered at some or all parking lots. A parking reservation provides a measure of assurance of the availability of parking at a given parking lot, and may specify availability at a particular parking stall at the given parking lot for example. In one instance, the smart device 12 may communicate to the server 18, at any time prior to actually parking, a request for a parking reservation. The server 18 in the first embodiment is operable to query the database 20 for availability and subsequently confirm or deny the parking reservation, such as in a reply communication to the smart device 12. The application program installed in the smart device 12 may provide further user features such as integrating the parking reservation into a calendar system, etc. Typically before communicating confirmation of a parking reservation, the server 18 creates the parking reservation by updating the database 20, which may include associating the parking reservation in the database 20 with the smart device 12 identification for example. Additionally or alternatively to direct communications between the smart device 12 and the server 18, a third-party computerized parking reservation system (shown in FIG. 1 as an additional resource 22) may be employed. In such instance, the parking reservation system communicates a request for a parking reservation to the server 18, which then confirms or denies availability, such as by a reply communication from the server 18 to the third-party parking reservation system. The server 18 may create the parking reservation by creating an association in the database 20 between the parking reservation and the smart device 12 identification, a particular identification specified by the third-party parking reservation system, other identifying means, and any combination thereof for example. In some embodiments, parking reservations are offered via a website interface, which may be a third-party operated website for example, and communications with the server 18 are effected via the Internet 16. In some embodiments, the third-party parking reservation system is provided with direct access to the database 20, and parking reservations are created by the third-party parking reservation system. Additionally or alternatively, the server 18 may be operable to communicate specifiable database 20 contents to the third-party parking reservation system such that the third-party parking reservation system is operable to create a parking reservation, which may be an offline parking reservation for example.

In some embodiments, the server 18 is operable to communicate a parking reservation status or other notification to one or both of the smart device 12 and a third-party computerized system (shown in FIG. 1 as an additional resource 22), which may be a third-party parking reservation system. Such notification may include a reminder that a monthly (or other periodic) payment is due soon; notice that a payment is now due; notice that a payment is overdue; notice of a penalty of any kind; notice of a fee reduction; notice of a fee reimbursement (e.g. by a third-party business); notice of elimination of a fee (e.g. by promotional offer); a reminder that a parking reservation that is coming soon remains valid; notice that a parking reservation will expire soon; notice that a parking reservation has expired; notice that a reserved or unreserved parking session will expire soon; notice that a reserved or unreserved parking session has expired; notice that a reserved or unreserved parking session has begun (e.g. to the smart device 12 and/or a nearby business); notice to the smart device 12 and/or third-party computerized system that a reserved or unreserved parking session has ended (e.g. upon vacating a parking stall and/or the parking lot); notice of a parking status; other notifications; and any combination thereof for example. Notifications may be communicated by the server 18 by text message (e.g. MMS, SMS, etc.), e-mail, automated voice call, telecommunication, machine-to-machine communications, other communication protocols or schemes, and any combination thereof for example. Notifications to the smart device 12 may involve executing by the smart device 12 functions of the application program installed therein in accordance with the present invention. Notices of parking status includes in some embodiments transmitting by the server 18 a parking status to a third-party parking enforcement agency (shown in FIG. 1 as an additional resource 22). For example, a list of expirations may include future dates and times of upcoming expirations and/or past dates and times of now expired statuses may be transmitted. Such list may be associated with particular parking stalls, an entire parking lot, particular smart device 12 identifications, particular vehicles, etc., so as to facilitate predictive patrolling. To associate a parking status with a particular vehicle, the database 20 may include, in association with a given smart device 12 identification, a vehicle identification (e.g. licence plate number), which may have been entered into the database 20 in response to user input received from the smart device 12 during registration, for example.

In the first embodiment, the server 18 is operable to query the database 20, search a lookup table, or otherwise determine a location associated with the entry beacon 35 identification. By way of examples, the server 18 in variations of embodiments is operable to determine the location of the smart device 12 by associating the entry beacon 35 identification received from the smart device 12 with a particular entry beacon 35 installed at a particular location or parking lot, with a particular entry controller 24 installed at a particular location or parking lot, with a particular entry barrier in proximity to the identifiable entry beacon 35, with a particular parking stall or restricted section in proximity to the identifiable entry beacon 35, other associations, and any combination thereof for example.

In the first embodiment, the server 18 transmits to the entry controller 24 a command to open the entry barrier if the smart device is determined by the server 18 to be at an entry location (such as being located at the entry lane on the exterior side of the entry barrier, for example) and the status associated with the smart device 12 identification is indicating there is no entry rejection of the smart device 12.

In the exemplary scenario of FIG. 2, after the entry controller 24 receives the open-barrier command, the entry controller 24 receives an indication as to whether a vehicle is present at the entry location (e.g. at the entry lane on an exterior side of the entry barrier). In the exemplary embodiment shown in FIG. 1, the presence of a vehicle located at the vehicle entry location is sensed by the vehicle sensor 28. Typically, the entry controller 24 controls the vehicle sensors 28 and 30 to track the location of the vehicle as it passes by the entry barrier.

In some embodiments, however, the server 18 issues a command to the entry controller 24 to determine whether a vehicle is present at the vehicle entry location; the entry controller 24 controls its associated vehicle sensor 28 to obtain the presence indication; the entry controller 24 transmits the presence indication to the server 18; and then the server 18 transmits the open-barrier command to the entry controller 24 if the entry beacon 35 identification is associated with the particular entry controller 24, the presence indication confirms that a vehicle is present at the vehicle entry location, and the status associated with the smart device 12 identification is indicating there is no entry rejection of the smart device 12. In variations, the server 18 may issue the command to the entry controller 24 to determine whether a vehicle is present at one or more vehicle entry locations at any time after the server 18 receives the entry request for example.

In some embodiments, one or more of the vehicle sensors 28 to 34 are continuously monitoring for the presence of a vehicle at their respective locations and continuously transmitting indications of presence or absence. In the exemplary scenario of FIGS. 1 and 2, the smart device 12, the smart device 12 user, and the user's vehicle arrive in front of the entrance gate at approximately the same time. In embodiments in which the vehicle sensor 28 is continuously monitoring for the presence of vehicles, the vehicle sensor 28 is transmitting the presence indication at approximately the same time as the smart device 12 is receiving the entry beacon 35 identification. Thus, the server 18 is receiving the entry request at approximately the same time as the vehicle presence is being detected and transmitted to the server 18 (e.g. directly and/or via the entry controller 24). The server 18 is thereafter operable to determine whether to issue an open-barrier command to the entry controller 24 on the basis of the entry beacon 35 identification, the vehicle presence and the status associated with the smart device 12. In general, the system 10 is operable to determine whether the entry location of the smart device 12 and the vehicle entry location are associated locations (e.g. both at the entry lane on an exterior side of the entry barrier).

After the system 10 determines that the entry barrier should be opened, the entry controller 24 opens the entry barrier, thereby permitting the vehicle to enter the parking lot. When the vehicle has moved forward from the exterior side of the entry barrier to the interior side of the entry barrier, the vehicle sensor 28 then senses the absence of a vehicle (in the exemplary scenario where another vehicle does not immediately fill the vacant position in front of the entry barrier). Also, the vehicle sensor 30 senses the presence of a vehicle when it arrives at the interior side of the entry lane adjacent the entry barrier, and the entry controller 24 closes the entry barrier.

In the first embodiment, the server 18 is operable to override the ordinary operation of the entry controller 24 and issue a command for the entry controller 24 to close the entry barrier. In some embodiments, the entry controller 24 does not close the entry barrier until receiving a close-barrier command from the server 18. In some embodiments, indications of the presence and/or absence sensed by the vehicle sensor 30 are transmitted to the server 18, which transmits a command to the entry controller 24 to close the entry barrier.

When the server 18 becomes aware that the entry barrier has been opened and then closed, such as by receiving an entry-barrier status from the entry controller 24 as shown in FIG. 2, the server 18 is operable to store an updated count of the number of vehicles that have entered the parking lot through the entry barrier. In the first embodiment, the server 18 is also operable to store the time at which the entry occurred, for subsequent use in calculating a parking fee based on the duration time spent parking. Typically, the count of vehicles that have entered the parking lot (or other related quantities, such as lot occupancy) and the timestamps are stored by the server 18 in the database 20.

As shown in FIG. 2, the server 18 is operable to interact with third-party systems (shown in FIG. 1 as additional resources 22), such as by notifying selected third parties, if any, of the entry associated with the smart device 12 identification. In the first embodiment, the server 18 is operable to permit the smart device 12 user to specify a number of local businesses to be notified when the smart device 12 user arrives at the parking lot. For example, the smart device 12 user may select a local cafe to be automatically alerted on specifiable days (e.g. weekdays only, etc.) of their arrival at the parking lot, such that the cafe is able to prepare a specific beverage and food order to be ready as soon as the smart device 12 user arrives on foot at the cafe. In the first embodiment, the server 18 is operable to store a list of participating businesses or other third-party entities from which the smart device 12 user may select to receive notifications. Such list of participating entities may be restricted geographically to nearby locations, for example. By way of further examples, the server 18 may be operable to transmit a notification to a third-party reservation system (e.g. "The reservation is fulfilled."); to the user (e.g. "Your reservation has begun."); to a third-party parking management system (e.g. "Our lot is 96% full."); potential users such as individuals in nearby vehicles (e.g. "We have 30 parking stalls available."); third-party sales systems (e.g. "We have 20 parking stalls available at a time-limited discounted price."); other notification recipients; and any combination thereof for example. Notification may be performed by any suitable communications technology, such as via the Internet 16 for example. The notification feature is an optional feature and need not be implemented in all embodiments.

For parking lots having a plurality of restricted sections, the status associated with a smart device 12 identification preferably indicates entry and exit acceptances and rejections in respect of each of the plurality of restricted sections. After entering a first section, entry into a second section may proceed in a manner analogous to entry into the first section. In some embodiments, no further user input is required for access to further restricted sections to which the smart device 12 user has access in accordance with their status. In such embodiments, the system 10 may include any number of beacons 35 and/or 36, or any number of other location sensors (implemented as enhanced variations of the beacons 35 and/or 36), and is operable to determine the location of the smart device 12 as it approaches a further entry barrier, or possibly a stall barrier, without requiring further user input into the smart device 12. Upon determining that the smart device 12 is near or adjacent the further entry barrier or stall barrier, upon determining that a vehicle is present at such further entry barrier or stall barrier, and upon determining that the status associated with the smart device 12 identification indicates there is no entry rejection of the smart device 12 to the further entry barrier or stall barrier, then the system 10 is operable in such embodiments to open the further entry barrier or stall barrier.

In embodiments in which the server 18 in conjunction with the one or more vehicle sensors associated with a given parking stall implement a stall barrier and its associated entry and/or exit controller(s) 24 and 26, one or more beacons or other location sensors associated with the given stall are employed to determine the smart device 12 location. In this manner, the server 18 is operable to determine whether the entry location of the smart device 12 and the vehicle entry location are associated locations (e.g. both at the given stall at the time of entering the given stall) and whether the exit location of the smart device 12 and the vehicle exit location are associated locations (e.g. both at the given stall at the time of exiting the given stall).

Figure 3:
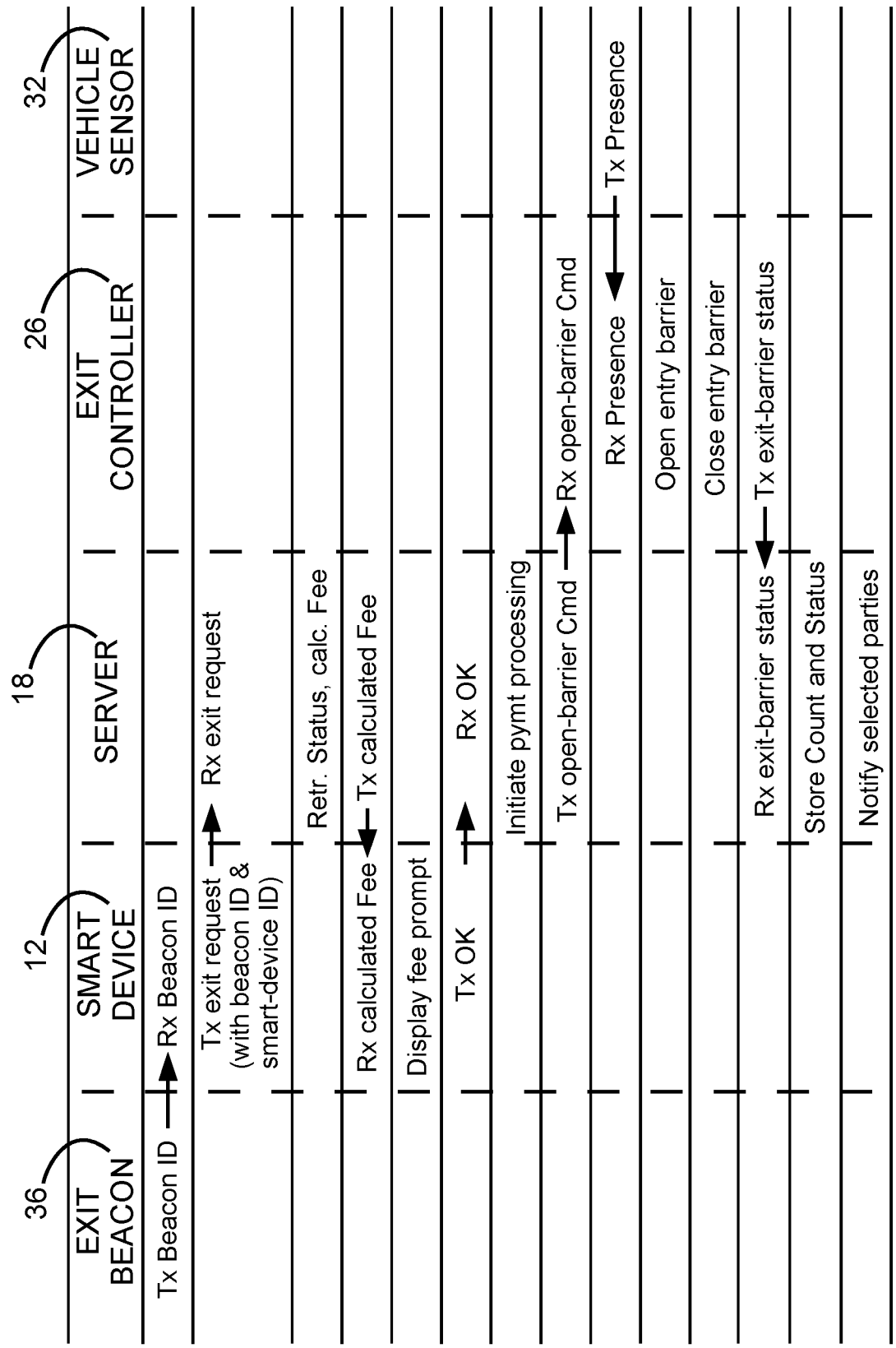
FIG. 3 is a signal timeline chart for the system shown in FIG. 1, showing the communication of messages between system components including an exit controller.

Referring to FIGS. 1 and 3, the exemplary parking scenario involving the first embodiment of the invention continues, at the conclusion of a parking session, with the smart device 12 receiving an exit beacon 36 identification from an exit beacon 36 of the parking lot. Any given parking lot may include any number of location beacons 35 and 36, including separate entry and exit beacons 35 and 36 for example. In some embodiments, the exit beacon 36 and the entry beacon 35 are the same beacon located at that entry/exit location and having only one unique beacon identification. In some embodiments, there are multiple entry beacons 35 and/or multiple exit beacons 36. Preferably, each separate beacon has its own unique beacon identification. In the exemplary scenario, the smart device 12 communicates an exit request to the server 18, which receives that exit request.

In the first embodiment, the server 12 determines the identification and location of the smart device 12 on the basis of the received exit request and any other accompanying communications between the smart device 12 and the server 18. In the first embodiment, the server 18 determines the location of the smart device 12 by look-up table (e.g. in database 20) so as to associate the exit beacon 36 identification with a specific location (e.g. with a particular exit controller 26 operable to control a particular exit barrier at that specific location), such that the smart device 12 becomes known to the server 18 to be at an exit location (e.g. the exit lane on the interior side of the entry barrier).

While FIG. 3 shows an exemplary scenario involving the first embodiment having beacons 35 and 36, in some embodiments a given parking lot may include one or more location sensors (implemented as enhanced variations of the beacons 35 and 36) operable to determine the location of the smart device 12 in response to two-way communications between the smart device 12 and the location sensor(s), such as by trilateration or other techniques in which the location sensor(s) calculate or otherwise determine the smart device 12 location. In such embodiments, the smart device 12 may transmit an exit request to the location sensor(s) containing the smart device 12 identification. Thereafter, the location sensor(s) determine the location of the smart device 12, and then transmit the smart device 12 identification and the smart device 12 location to the server 18, or to the exit controller 26 which forwards them to the server 12. Additionally or alternatively, the location sensor(s) and/or exit controller 26 may include server 18 functionality such that the location sensor(s) and/or exit controller 26 further process the smart device 12 identification and smart device 12 location.

Using the smart device 12 identification, the server 18 queries the database 20 for the current status associated with that smart device 12 identification, and retrieves the current status from the database 20.

In the exemplary scenario of FIG. 3, the server 18 in the first embodiment also calculates a parking fee on the basis of a parking rate associated with the smart device 12 identification and the duration of time spent parking. In general, the parking rate may vary with different smart device 12 identifications due to different smart device 12 users purchasing different parking services. For example, some smart device 12 users are willing to pay a higher parking rate to park at a more convenient parking stall of a given parking lot, while other smart device 12 users may be willing to park at a less convenient parking stall of the given parking lot in order to receive a lower parking rate. Thus, in some embodiments the server 18 is operable to select an applicable parking rate from a plurality of parking rates associated with the parking lot. In some embodiments, however, the same parking rate is applied regardless of the smart device 12 identification such that the server 18 calculates the parking fee on the basis of factors other than the smart device 12 identification. In some embodiments, the server 18 receives the parking rate from an additional resource 22 (FIG. 1).

In the first embodiment, the server 12 is operable to calculate the parking fee on the basis of a known parking rate multiplied by the duration of time spent parking. Such duration of time is determined by the server 18 as the difference between the time at which an exit associated with a smart device 12 identification from a parking stall, restricted section or the parking lot is occurring and the time at which the corresponding entry associated with the same smart device 12 identification occurred. For example, the parking rate may be $3 per hour and the parking duration 78 minutes, in which case the parking fee would be $3.90. Other calculations of a parking fee are possible, such as $6.00 in this example if the parking duration is quantized by the hour rather than by the minute, for example. In general, any suitable parking fee calculation scheme may be employed.

In a variation, the parking fee may be determined solely on the basis of the smart device 12 identification, such as in the case of a parking subscription in which a smart device 12 user pays periodically (e.g. monthly) for time-unlimited parking at the parking lot. Subscription parking may involve restrictions as to which parking stall or stalls are available, time-of-day restrictions (e.g. during regular working hours only), etc. In the case of subscription parking, payment typically does not coincide with parking lot exits as shown in the exemplary scenario of FIG. 3. For example, payment processing for a monthly subscription may occur automatically at the first day of each month, for example. By way of further example, payment processing for an "all-day" parking permit may occur when the vehicle associated with a smart device 12 is entering the parking lot at the beginning of the all-day parking session. In general, the server 18 is operable in various embodiments to calculate and/or collect the parking fee at any time before, during, or after a given parking session.

In the exemplary scenario of FIG. 3, the server 18 transmits the calculated time-based parking fee (e.g. $3.90) to the smart device 12, which displays the calculated parking fee to the user in the form of a fee prompt (e.g. "Do you accept the charge of $3.90?"), and an OK button for the smart device 12 user to accept payment processing of the parking fee in accordance with pre-registered payment preferences and information associated with the smart device 12 identification. In a variation, pre-registered payment preference(s), if any, may be overridden at the time by the user such that payment processing occurs in response to a payment method and/or other payment preference(s) specified by the user after the display of the calculated parking fee. In variations, any suitable user input format may be employed for the OK button (e.g. voice command, biometric input, a visually detectable user gesture, other user input, or any combination thereof for example). Additionally, the smart device 12 in the exemplary embodiment also displays a Cancel button (or similar) for the smart device 12 user to reject the displayed charge. In various embodiments, rejection by the smart device 12 user may result in the server 18 issuing an alert for a human attendant to assist the smart device 12 user, initiation of a telephone call between the smart device 12 and a telephone associated with the parking lot (e.g. call center), opening an informational webpage in a browser of the smart device 12, a failure of the exit barrier to open, other error handling procedures, or any combination thereof for example. In some embodiments, a Cancel option is not provided.

In the exemplary scenario of FIG. 3, the smart device 12 user presses the OK button such that the smart device 12 transmits an OK signal to the server 18. Upon receiving the OK signal, the server 18 initiates payment processing. Any suitable payment processing technique is within the scope contemplated by the present invention, including processing by a third-party payment processing service accessible as an additional resource 22 for example.

In the exemplary scenario of FIG. 3, the system 10 had determined the location of the smart device 12 is at the exit location, and the status associated with the smart device 12 identification indicates there is no exit rejection of the smart device 12. In the first embodiment, the server 18 accordingly transmits an open-barrier command to the exit controller 26, which receives the open-barrier command.

In the exemplary scenario of FIG. 3, after the exit controller 26 receives the open-barrier command, the exit controller 26 receives an indication as to whether a vehicle is present at the vehicle exit location. In the exemplary embodiment shown in FIG. 1, the presence of a vehicle located at the vehicle exit location is sensed by the vehicle sensor 32. Typically, the exit controller 26 controls the vehicle sensors 32 and 34 to track the location of the vehicle as it passes by the exit barrier during its departure from the parking lot.

In some embodiments, however, the server 18 issues a command to the exit controller 26 to determine whether a vehicle is present at the vehicle exit location; the exit controller 26 controls its associated vehicle sensor 32 to obtain the presence indication; the exit controller 26 transmits the presence indication to the server 18; and then the server 18 transmits the open-barrier command to the exit controller 26 if the exit beacon 36 identification is associated with the particular exit controller 26, the presence indication confirms that a vehicle is present at the vehicle exit location, and the status associated with the smart device 12 identification indicates there is no exit rejection of the smart device 12. In variations, the server 18 may issue the command to the exit controller 26 to determine whether a vehicle is present at the vehicle exit location at any time after the server 18 receives the exit request for example.

In some embodiments, one or more of the vehicle sensors 28 to 34 are continuously monitoring for the presence of a vehicle at their respective locations and continuously transmitting indications of presence or absence. In the exemplary scenario of FIGS. 1 and 3, the smart device 12, the smart device 12 user, and the user's vehicle arrive at the exit barrier on its interior side at approximately the same time. In embodiments in which the vehicle sensor 32 is continuously monitoring for the presence of vehicles, the vehicle sensor 32 is transmitting the presence indication at approximately the same time as the smart device 12 is receiving the exit beacon 36 identification. Thus, the server 18 is receiving the exit request at approximately the same time as the vehicle presence is being detected. In embodiments in which the exit controller 26 transmits the presence indication to the server 18, the server 18 is thereafter operable to determine whether to issue an open-barrier command to the exit controller 26 on the basis of the exit beacon 36 identification, the vehicle presence and the status associated with the smart device 12.

In general, the system 10 is operable to determine whether the exit location of the smart device 12 and the vehicle exit location are associated locations (e.g. both at the exit lane on an interior side of the exit barrier).

In the first embodiment, the system 10 opens the exit barrier regardless of the identity of the vehicle itself, provided the smart device 12 is identified, located appropriately, has an appropriate associated status, and any vehicle is present at the vehicle exit location. However, in some embodiments, a vehicle identification is obtained by any suitable scheme such that the system 10 will not open the exit barrier unless the vehicle at the vehicle exit location, when a given smart device 12 with appropriate status is also at the associated exit location, is the same vehicle that entered when the smart device 12 had previously requested entry or otherwise entered. Additionally or alternatively in such embodiments, other error handling operations may be performed if the vehicle identifications associated with a smart device 12 identification at entry and at exit do not match. Suitable schemes for identifying a vehicle include visual detection of the vehicle by computerized image analysis of video data, visual detection of a licence plate number by computerized image analysis of video data, a magnetic signature determined by a magnetometer of the parking lot when the vehicle passes by the magnetometer, receipt by the system 10 of a communications from a smart vehicle in which the communication contains a vehicle identification number (VIN) or other vehicle identification code, other techniques, and any combination thereof for example. The various schemes of the present invention for identifying a vehicle advantageously do not require any special modification of the vehicle itself nor the use of any in-vehicle display. Communications between a smart vehicle and the system 10 may employ any suitable communications technology, including communications technologies described herein above in respect of smart devices 12 not integrated with a vehicle; vehicle-specific communications technologies such as DSRC (Dedicated Short-Range Communications); other communications technologies; and any combination thereof for example.

In variations of embodiments, the open-barrier command may be issued as soon as payment processing is initiated, after payment processing is successfully completed, after a sufficient amount of time for payment processing to occur has elapsed, or any combination thereof. For example, payment processing associated with some smart device 12 identifications may need to be successfully completed before opening the exit barrier, while the exit barrier will be opened as soon as payment processing is initiated for the same or different set or type of smart device 12 identifications. In some embodiments, the status associated with the smart device 12 identification is updated after payment processing is initiated and/or completed, and in such embodiments the server 18 determines whether to issue the open-barrier command on the basis of the updated status.

Upon receiving the open-barrier command, the exit controller 26 opens the exit barrier to permit the vehicle to exit the parking lot. When the vehicle has moved forward from the interior side of the exit barrier to the exterior side of the exit barrier, the vehicle sensor 32 then senses the absence of a vehicle (in the exemplary scenario where another vehicle does not immediately fill the vacant position at the exit barrier). Also, the vehicle sensor 34 senses the presence of a vehicle when it arrives at the exterior side of the exit lane adjacent the exit barrier, and the exit controller 26 closes the exit barrier.

In the first embodiment, the server 18 is operable to override the ordinary operation of the exit controller 26 and issue a command for the exit controller 26 to close the exit barrier. In some embodiments, the exit controller 26 does not cause the exit barrier to close until receiving a close-barrier command from the server 18. In some embodiments, indications of absence and/or presence sensed by the vehicle sensor 34 are transmitted to the server 18, which transmits a command to the exit controller 26 to close the exit barrier.

For a stall barrier that remains open during the parking session, the system 10 is operable to close the stall barrier (e.g. move it back into its obstruction position or otherwise indicate access is restricted) at any time after the vehicle has vacated the parking stall. In such embodiments, the server 18 may receive a communication from the smart device 12 user prior to or after vacating the parking stall, in which case the system 10 is preferably operable to close the stall barrier when the system 10 determines that no vehicle is present at the stall. For example, the system 10 may be operable to determine whether the smart device 12 is located in or away from the restricted parking stall. Additionally or alternatively, a vehicle sensor may be located at or near the restricted parking stall and operable to sense the absence or presence of a vehicle at the restricted parking stall. Other techniques, such as image analysis of video data showing the restricted parking stall may be employed, for example. In some embodiments, however, the system 10 is operable to close the stall barrier associated with the smart device 12 identification when interacting with the smart device 12 at an interior or outer perimeter exit barrier. Closing the stall barrier in such embodiments is in addition to opening and closing an exit barrier for a restricted section or the outer perimeter of the parking lot.

In the exemplary scenario where the exit barrier is an outer perimeter barrier, when the server 18 becomes aware that the exit barrier has been opened and then closed, such as by receiving an exit-barrier status from the exit controller 26 as shown in FIG. 3, the server 18 is operable to store an updated count of the number of vehicles that have exited the parking lot through the exit barrier. Additionally or alternatively, the server 18 may store an updated count of the number of vehicles occupying the parking lot by incrementing the lot occupancy count each time the outer perimeter entry barrier is opened then closed and decrementing the lot occupancy count each time the outer perimeter exit barrier is opened then closed. In variations, the server 18 may store a lot occupancy percentage, number of available parking stalls remaining, or other related quantities. Typically, the lot occupancy or related quantity is stored in the database 20. In the first embodiment, the server 18 is operable to communicate a measure of lot occupancy to other computerized systems (shown in FIG. 1 as additional resources 22), including third-party systems which may include one or more third-party parking reservation systems for example.

In the exemplary scenario of FIG. 3, the payment processing completes successfully and the server 18 stores an updated value of the status associated with the smart device 12 identification in the database 20.

While payment processing was described as being initiated shortly before the exit barrier was opened according to the exemplary scenario of FIG. 3, in general payment processing may occur at any suitable time. For example, payment processing for parking subscribers may occur at periodic intervals independent of when parking is occurring, such as on the first day of each month, each week or other period, etc. In some embodiments, such as where the parking fee is not time-based, payment processing can occur when a vehicle is entering the parking lot, including before the entry barrier is opened to permit entry of the vehicle. In some embodiments, the payment processing occurs between entry and exit of the vehicle for example. While the status associated with a given smart device 12 identification is typically updated and stored after each payment process, the associated status may be updated and/or stored at any time.

As shown in FIG. 3, the server 18 is operable to interact with third-party systems (shown in FIG. 1 as additional resources 22), such as by notifying selected third parties, if any, of the exit associated with the smart device 12 identification. Such exit notifications may proceed in an analogous fashion to the entry notifications described herein above.

In embodiments in which the server 18 in conjunction with the one or more vehicle sensors associated with a given parking stall implement a stall barrier and its associated entry and/or exit controller(s) 24 and 26, the system 10 is operable to open the stall barrier by the server 18 authorizing parking (e.g. prevent parking enforcement action against a vehicle or its driver, such as preventing the communication of an alert instructing that the vehicle should be towed or otherwise not issuing an alert indicating non-authorization) in the given stall in response to the sensed presence of a vehicle in the given stall, the determined smart device 12 location (e.g. at the given stall), and the smart device 12 status (e.g. the smart device 12 user not being banned from parking in the given stall due to prior parking infractions, the smart device 12 being properly pre-registered with the system 10, other status criteria, and any combination thereof for example). Also, in such embodiments the system 10 is operable to close the stall barrier by authorizing exit from the given stall (e.g. prevent further enforcement action such as payment collections against a smart device 12 user account, or otherwise not issue an alert indicating non-authorization) in response to the sensed departure of the vehicle from the given stall, the determined smart device 12 location at the time of vehicle departure (e.g. at the given stall), and the smart device 12 status (e.g. the account associated with the smart device 12 being in compliance with payment requirements of the parking lot). Typically, the entry and exit authorizations involve storing entry and exit authorization values in the database of the system 10, respectively, such as in association with the smart device 12 status. The server 18 may also communicate message(s) to the smart device 12 confirming the entry and/or exit authorization, as each occurs for example. In some embodiments and parking lots, the stall barrier(s) associated with each given stall that are implemented by the server 18 operation in conjunction with the one or more vehicle sensors associated with each given stall are the only entry and exit barriers of the parking lot.

Thus, there is provided a computerized system for managing a parking lot, the system including: (a) an entry beacon operable to transmit an entry-beacon identification of the entry beacon; (b) an exit beacon operable to transmit an exit-beacon identification of the exit beacon, the exit beacon being selected from the group consisting of the entry beacon and another beacon separate from the entry beacon; (c) a first vehicle sensor operable to sense the presence of a first vehicle at a vehicle entry location of the parking lot; (d) a second vehicle sensor operable to sense the presence of a second vehicle at a vehicle exit location of the parking lot, the second vehicle sensor being selected from the group consisting of the first vehicle sensor and another vehicle sensor separate from the first vehicle sensor, the exit location being selected from the group consisting of the entry location and another location separate from the entry location, the second vehicle being the first vehicle or another vehicle separate from the first vehicle; and (e) a computer-implemented server operable to receive from a smart device each of the entry-beacon identification and the exit-beacon identification, operable to determine the location of the smart device in response to said each of the entry-beacon identification and the exit-beacon identification, operable to determine a status associated with the smart device, operable to authorize an entry of the first vehicle when the status indicates no entry rejection of the smart device, the determined location of the smart device is at the entry location, and the first vehicle sensor senses the presence of the first vehicle at the entry location, operable to determine an updated value of the status in response to a payment transaction associated with the smart device, and operable to authorize an exit of a second vehicle when the status indicates no exit rejection of the smart device, the determined location of the smart device is at the exit location, and the second vehicle sensor senses that the second vehicle is at the exit location.

Method of Operation

Figure 4:
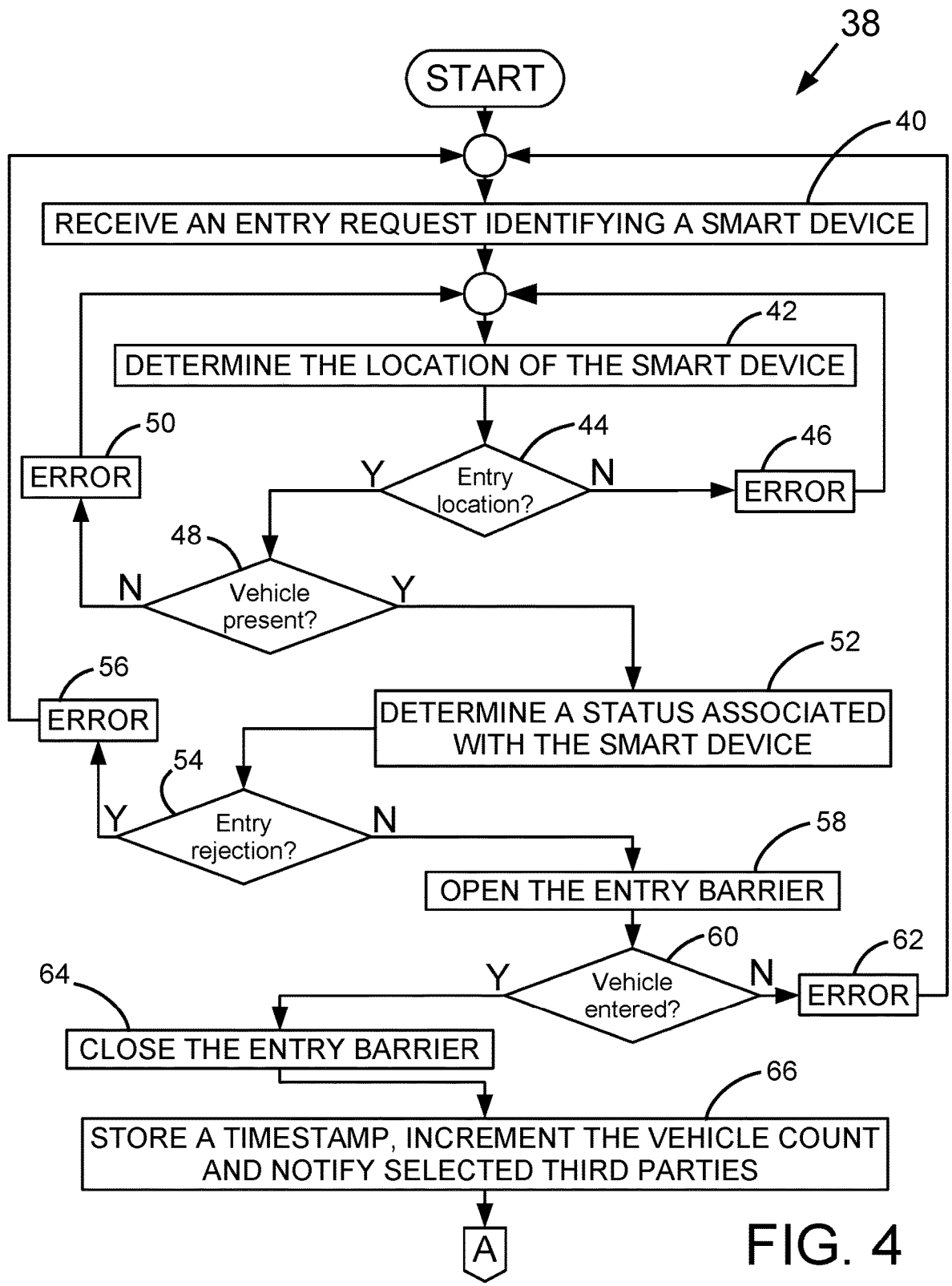
FIG. 4 is a first portion of a flow diagram of a computer-implemented method of managing a parking lot according to the first embodiment of the invention, showing method steps associated with an entry request.

Referring to FIGS. 1 and 4, the read/write memory of the server 18 in accordance with the first embodiment of the invention contains blocks of code comprising computer executable instructions for directing the CPU or other processing circuit of the server 18 to perform operations of the parking controller system 10. Also, in the first embodiment the entry controller 24 memory, exit controller 26 memory, an entry beacon 35 memory and an exit beacon 36 memory each contain blocks of code comprising computer executable instructions for directing the entrance gate controller 24 CPU, exit gate controller 26 CPU, entry beacon 35 CPU, and exit beacon 36 CPU, respectively. Collectively, the CPUs of the parking controller system 10 are directed to perform respective steps of a method shown generally at 38.

Additionally or alternatively, one or more of such blocks of code may form part of a computer program product comprising computer executable instructions embodied in a non-transitory computer readable medium.

When electrical power is being supplied to the various CPUs of the parking controller system 10, the server 18 CPU is directed to begin executing the instructions of block 40.

Block 40 directs the server 18 CPU to receive an entry request identifying a smart device 12. Receiving an entry request identifying a smart device 12 typically involves receiving or otherwise determining a telephone number identifying the smart device 12. However, any suitable unique identifier may be employed. The server 18 may receive communications directly from the smart device 12 via the direct link 14 and/or via the Internet 16 for example.

After block 40 has been executed, block 42 then directs the server 18 CPU to determine the location of the particular smart device 12 from which the entry request had been received. Typically, the entry request includes the identification code of a beacon 35 or 36. However, in some embodiments communications other than the entry request per se are employed for the server 18 to receive the beacon 35 or 36 identification. Such other communications may occur prior to or after the entry request is transmitted. In the first embodiment, determining the location of the smart device 12 involves querying the database 20 or otherwise searching memory for an association between the received beacon 35 or 36 identification and an entry or exit barrier, such as by identifying an entry or exit controller 24 or 26 that corresponds to the received beacon 35 or 36 identification. In some embodiments, the smart device 12 also communicates to the server 12 a distance between the smart device 12 and each identified beacon 35 and/or 36, such that the server 18 is able to determine the location of the smart device 12 with greater accuracy.

In a variation of embodiments, block 42 may direct a location sensor CPU to determine the location of the particular smart device 12 from which the entry request had been received, such as by a plurality of wireless communications devices (not shown) receiving the communication transmitted wirelessly from the smart device 12 and determining the location by trilateration of the multiply-received communication.

After executing block 42, block 44 directs the server 18 CPU to determine whether the location is an entry location. Determining whether the location is an entry location typically involves determining whether the location determined by block 42 is associated with an entry lane on the exterior side of an entry barrier, such as by being associated with a given entry barrier and/or the entry controller 24 (FIG. 1). In variations, the boundary of the entry location will vary but typically is commensurate with being bounded by the entry lane no more than one vehicle's distance away from the entry barrier on the exterior side thereof. In some embodiments, determining whether the location is an entry location involves determining the location of the smart device 12 multiple times as it moves within the vicinity of the entry beacon 35 until the location of the smart device 12 is determined by the server 18 to be at the entry location. Determining whether the location is an entry location may involve determining that the location(s) of the smart device 12 has been within the bounds of the entry location for a minimum period of time, which may be in the range of a few microseconds to several seconds for example. If by executing block 44 the location is determined not to be an entry location, block 46 directs the server 18 CPU to perform error handling operations, which in variations may include waiting for the smart device 12 to move into the entry location, waiting until a time-out occurs, executing an error handling routine following a time-out, transmitting an error message to the smart device 12, updating the status associated with the smart device 12 identification, ignoring the previously received entry request, other error handling procedures, and any combination thereof for example.

In some embodiments, a location sensor (as an enhanced variation of the beacons 35 and 36) determines whether the smart device 12 location is an entry location, and may communicate a final determination to the server 18 for example. Additionally or alternatively, some or all of the error handling operations of block 46 may be executed by the location sensor CPU (not shown).

After block 46 has been executed, the process returns to block 42.

If by block 44 the location is determined to be an entry location, then block 48 directs the server 18 CPU to determine whether a vehicle is present in the vehicle entry location (e.g. in the lane on the exterior side of the entry barrier). In the first embodiment, determining whether a vehicle is present involves sensing the presence of a vehicle by the vehicle sensor 28, detecting the sensed presence by the entry controller 24, and transmitting by the entry controller 24 to the server 18 an indication of the presence. In some embodiments, determining whether a vehicle is present involves multiple communications to the server 18 of an indication of the presence or absence of a vehicle until an indication of presence is received by the server 18. In some embodiments, determining whether a vehicle is present involves multiple determinations of the presence or absence of a vehicle followed by one communication by the entry controller 24 to the server 18 when the presence is determined. In some embodiments, determining whether a vehicle is present involves detecting or receiving by the server 18 the sensed presence directly from the vehicle sensor 28. In some embodiments, block 48 directs the entry controller 24 CPU to determine whether a vehicle is present.

If by block 48 it is determined that no vehicle is present, then block 50 directs the server 18 CPU to perform error handling operations, which in variations may include waiting for a vehicle to become present in the vehicle entry location, waiting until a time-out occurs, executing an error handling routine following a time-out, transmitting an error message to the smart device 12, updating the status associated with the smart device 12 identification, other error handling procedures, and any combination thereof for example. In some embodiments, some or all of the error handling operations of block 50 are executed by the entry controller 24 CPU.

After block 50 has been executed, the process in the first embodiment returns to block 42. However, in some embodiments (not shown), the process returns to block 48.

If by block 48 it is determined that a vehicle is present, then block 52 directs the server 18 CPU to determine a status associated with the smart device 12. Determining a status associated with the smart device 12 involves in the first embodiment querying the database 20 for the status associated with the smart device 12 identification that was previously obtained by the server 18 when block 40 was executed.

Block 54 directs the server 18 CPU to determine whether the status associated with the smart device 12 identification indicates an entry rejection. The status may indicate an entry rejection in a variety of circumstances suited to particular embodiments of the invention, such as if it is determined by block 52 that no status exists for the smart device 12 identification because the given smart device 12 is not pre-registered with the server 18, if the status indicates that the smart device 12 is not in compliance with payment requirements of the server 18, if the status indicates that the smart device 12 is associated with a person who has been banned from the parking lot for misconduct or other reasons, if the status indicates that the smart device 12 identification has been flagged as a fraudulent, incorrect, non-existent, or otherwise improper telephone number or other smart device 12 identification, or any combination thereof for example. Other status conditions are possible. Different parking lots may have different rules for determining whether a given status indicates an entry rejection, for example.

If by block 54 the server 18 CPU determines that the status indicates an entry rejection, then block 56 directs the server 18 CPU to perform error handling operations, which in variations may include transmitting an error message to the smart device 12 for display on the smart device 12 display screen, opening an informational webpage in a browser of the smart device 12, issuing an alert for a human attendant to assist the smart device 12 user, initiation of a telephone call between the smart device 12 and a telephone associated with the parking lot (e.g. call center), transmitting an audio message to the smart device 12, updating the status associated with the smart device 12 identification, other error handling procedures, and any combination thereof for example.

After block 56 has been executed, the process in the first embodiment returns to block 40. However, in various embodiments (not shown), the process returns to any one of blocks 42, 44, 48 and 54, for example. In some embodiments, the particular error handling steps taken by block 56 determine the block to which the process returns after block 56 has been executed.

If by block 54 the server 18 CPU determines that the status indicates there is no entry rejection of the smart device 12, then block 58 directs the entry controller 24 CPU to cause the entry barrier to open. In the first embodiment, opening the entry barrier involves transmitting an open-barrier command by the server 18 CPU to the entry controller 24. In the case of an entry gate or blockade, the entry controller 24 typically controls a motor that causes the entry gate or blockade to open (e.g. rotate, slide or otherwise move into an non-obstructing position). For a spanning catenary, the length of the cable or similar can be increased or decreased so that the catenary is lowered to be level with the ground or raised above the height of the vehicle, respectively, for example. Where the entry barrier is a visual indicator, however, the entry controller 24 is operable to alter the display of the visual indicator (e.g. change a red light to a green light) so as to open the entry barrier. Where the entry barrier is an audible indicator, the sound (e.g. automated verbal command) of the audible indicator can be selected to indicate a vehicle is permitted to pass, so as to open the entry barrier. Combinations of such entry barriers may be employed, for example.

In embodiments in which the server 18 in conjunction with the one or more vehicle sensors associated with a given parking stall implement a stall barrier and its associated entry and/or exit controller(s) 24 and 26, block 58 typically directs the server 18 CPU to open the entry barrier by communicating a message to the smart device 12 indicating entry authorization (e.g. "Welcome, payment will be processed according to your payment preferences."). Additionally or alternatively, block 58 may direct the server 18 CPU to store in the database 20 (FIG. 1) an entry authorization value such that the server 18 does not issue an alert to commence parking enforcement action against the vehicle present in the given stall. In such embodiments in which the server 18 and the one or more vehicle sensors associated with a given parking stall implement a stall barrier, the functionality of block 58 may be considered to have been performed by block 54 upon determination by the server 18 CPU that the status indicates there is no entry rejection of the smart device 12. While FIG. 4 shows a particular sequence for executing blocks 44, 48 and 54, in general these blocks may be executed in any order.

Block 60 directs the entry controller 24 CPU to determine whether a vehicle has entered past the entry barrier, such as an entrance gate (not shown). Determining whether a vehicle has entered past the entry barrier involves determining whether the vehicle at the entry location has vacated the entry location and become present at the interior side of the entry barrier. In the first embodiment, such method step involves sensing by the vehicle sensor 28 the absence of a vehicle and subsequently sensing by the vehicle sensor 30 the presence of a vehicle; and detecting the sensed absence and the sensed presence by the entry controller 24. In some embodiments, executing block 60 also involves communicating indications of vehicle absence and/or presence by the entry controller 24 to the server 18. In some embodiments, determining whether the vehicle has entered involves multiple sensing by the vehicle sensors 28 and 30 until a vehicular entry is determined. In some embodiments, determining whether the vehicle has entered involves receiving by the server 18 sensed absence and/or presence directly from the vehicle sensor 28 and/or from the vehicle sensor 30. In some embodiments, block 60 directs the server 18 CPU to determine whether the vehicle has entered.

If by block 60 it is determined that a vehicle has not entered, then block 62 directs the server 18 CPU to perform error handling operations, which in the first embodiment involves communicating by the entry controller 24 to the server 18 an indication that the vehicle has not entered, such as not entering after a specifiable time-out period has elapsed. In variations, performing error handling operations may include transmitting an error message to the smart device 12 for display on the smart device 12 display screen, opening an informational webpage in a browser of the smart device 12, issuing an alert for a human attendant to assist the smart device 12 user, initiation of a telephone call between the smart device 12 and a telephone associated with the parking lot, transmitting an audio and/or text message to the smart device 12, updating the status associated with the smart device 12 identification, displaying video of the scene captured by a security camera, issuing an alert to a human attendant to view video display of the scene, other error handling procedures, and any combination thereof for example.

After block 62 has been executed, the process in the first embodiment returns to block 40. However, in various embodiments (not shown), the process returns to any one of blocks 42, 44, 48, 54 and 60, for example. In some embodiments, the particular error handling steps taken by block 62 determine the block to which the process returns after block 62 has been executed.

If by block 60 it is determined that the vehicle has entered, then block 64 directs the entry controller 24 CPU to cause the entry barrier to close. In some embodiments, such as where it is the server 18 that determines whether the vehicle has entered, closing the entry barrier involves transmitting a close-barrier command by the server 18 CPU to the entry controller 24. In some embodiments, block 64 directs the server 18 CPU to directly cause the entry barrier to close. In embodiments in which the server 18 in conjunction with the one or more vehicle sensors associated with a given parking stall implement a stall barrier and its associated entry and/or exit controller(s) 24 and 26, block 64 is typically omitted.

After executing block 64 such that the entry barrier is closed, block 66 directs the server 18 CPU to store an entry timestamp, increment the vehicle count, and notify selected third parties, if any, of the entry associated with the smart device 12 identification. In the first embodiment, executing block 66 involves transmitting by the entry controller 24 to the server 18 an entry status indicating that the entry barrier is closed. In some embodiments, executing block 66 involves transmitting the entry status in association with the smart device 12 identification. In the first embodiment, storing a timestamp involves storing the current time in the database 20 in association with the smart device 12 identification, and incrementing the vehicle count involves updating a vehicle count stored in the database 20. In the first embodiment, notifying selected third parties involves communicating notifications, if any, indicating a parking session has begun. The notifications are typically communicated in response to a list of third-party systems (shown in FIG. 1 as additional resources 22), such as parking reservation systems or third-party systems that were previously selected by the smart device 12 user to be notified when the smart device 12 user arrives at the parking lot.

Still referring to FIG. 4, in embodiments having further entry barriers various steps of the method 38 shown in FIG. 4 may be repeated at each of the further entry barriers. For example, blocks 42 to 66 may be repeatedly executed. In some embodiments where repeated confirmations of the smart device 12 identification are desirable, blocks 40 to 66 may be repeatedly executed. For barriers such as stall barriers that remain open during the parking session, block 64, or blocks 60 to 64, may be omitted and the method 38 proceed from block 58 or 60 directly to block 66, for example.

Figure 5:
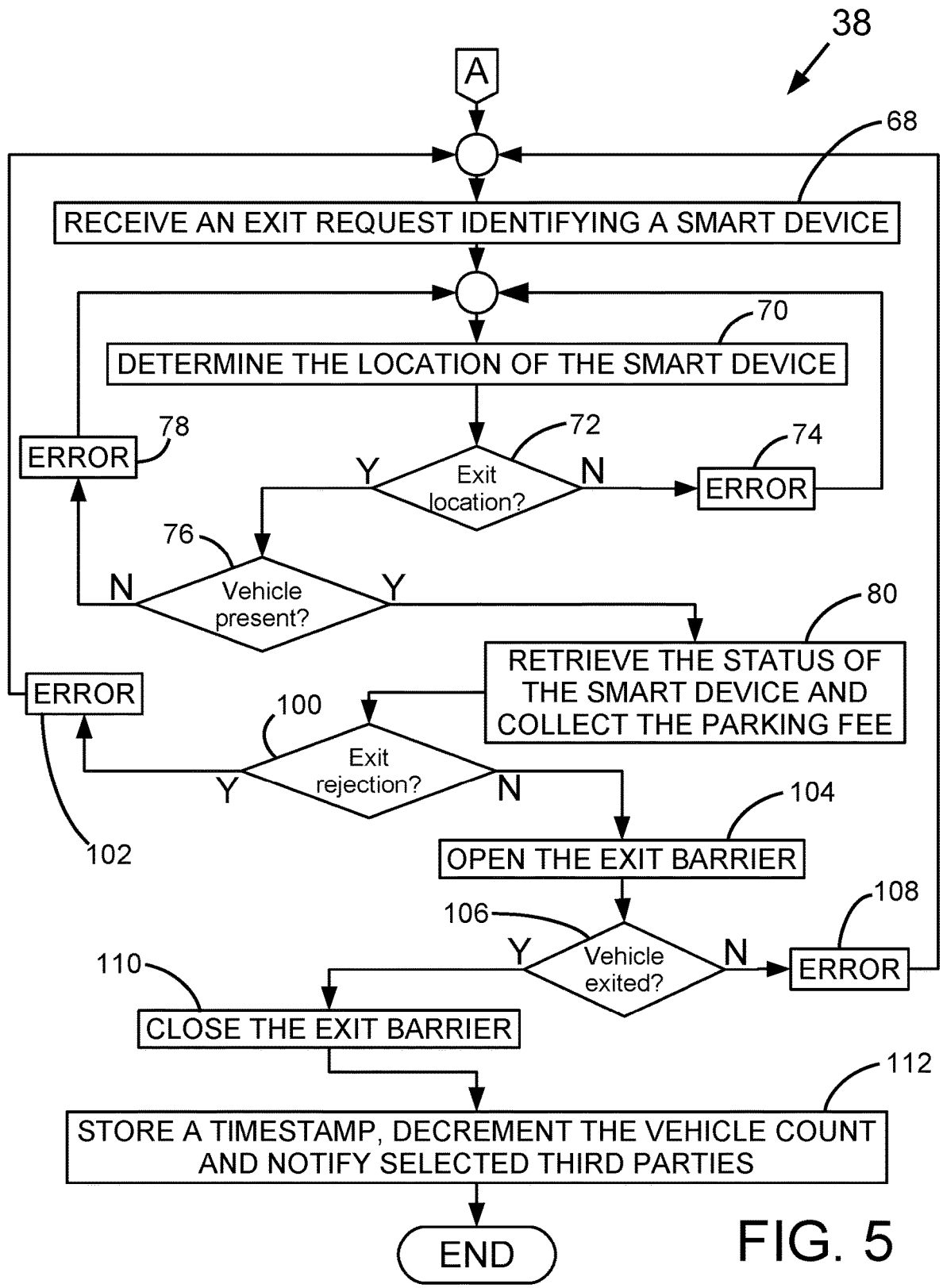
FIG. 5 is a second portion of the flow diagram shown in FIG. 4, showing method steps associated with an exit request.

Referring to FIGS. 4 and 5, after block 66 has been executed, at the conclusion of the parking session, block 68 in the first embodiment directs the server 18 CPU to receive an exit request identifying a smart device 12. In the first embodiment, receiving the entry request also involves communicating the smart device 12 identification by the smart device 12 to the server 18, such as by the direct link 14 (FIG. 1) and/or by the Internet 16 (FIG. 1). Receiving an entry request identifying a smart device 12 typically involves receiving or otherwise determining a telephone number identifying the smart device 12. However, any suitable unique identifier may be employed. In some embodiments, block 68 directs the server 18 CPU to receive an exit request identifying a smart device 12, such as by the server 18 receiving communications from a location sensor (not shown) after the location sensor has received the smart device 12 identification directly from the smart device 12 for example.

After block 68 has been executed, block 70 then directs the server 18 CPU to determine the location of the particular smart device 12 from which the entry request had been received. Typically, the entry request includes the identification code of a beacon 35 or 36. However, in some embodiments communications other than the entry request per se are employed for the server 18 to receive the beacon 35 or 36 identification. Such other communications may occur prior to or after the entry request is transmitted. In the first embodiment, determining the location of the smart device 12 involves querying the database 20 or otherwise searching memory for an association between the received beacon 35 or 36 identification and an entry or exit barrier. In some embodiments, the smart device 12 also communicates to the server 12 a distance between the smart device 12 and each identified beacon 35 and/or 36, such that the server 18 is able to determine the location of the smart device 12 with greater accuracy.

In a variation, block 70 may direct a location sensor CPU (not shown) to determine the location of the particular smart device 12 from which the exit request had been received. In such variation, determining the location of the smart device 12 involves receiving the communication transmitted from the smart device 12 by a plurality of wireless communications devices (not shown), such as near-field wireless communications devices (not shown), and determining the location by trilateration of the multiply-received communication.

After executing block 70, block 72 directs the server 18 CPU to determine whether the location is an exit location. Determining whether the location is an exit location typically involves determining whether the location determined by block 42 is associated with an entry lane on the exterior side of an entry barrier, such as by being associated with a given entry barrier and/or the entry controller 24 (FIG. 1). In variations, the boundary of the exit location will vary but typically is commensurate with being bounded by the exit lane no more than one vehicle's distance away from the exit barrier on the interior side thereof. In some embodiments, determining whether the location is an exit location involves determining the location of the smart device 12 multiple times as it moves within the vicinity of the exit beacon 36 until the location of the smart device 12 is determined by the server 18 to be at the exit location. Determining whether the location is an exit location may involve determining that the location(s) of the smart device 12 has been within the bounds of the exit location for a minimum period of time, which may be in the range of a few microseconds to several seconds for example.

If by executing block 72 the location is determined not to be an exit location, block 74 directs the server 18 CPU to perform error handling operations, which in variations may include performing operations similar to those described herein above in respect of block 46 (FIG. 4), with references in such description to entry or entrance being replaced by exit.

In some embodiments, a location sensor (as an enhanced variation of the beacon 35 and/or 36) determines whether the smart device 12 location is an exit location, and may communicate a final determination to the server 18 for example. Additionally or alternatively, some or all of the error handling operations of block 74 may be executed by the location sensor CPU (not shown).

After block 74 has been executed, the process returns to block 70.

If by block 72 the location is determined to be an exit location, then block 76 directs the server 18 CPU to determine whether a vehicle is present at the vehicle exit location associated with the smart device 12 exit location determined by block 72. In the first embodiment, determining whether a vehicle is present involves sensing the presence of a vehicle by the vehicle sensor 32, detecting the sensed presence by the exit controller 26, and transmitting by the exit controller 26 to the server 18 an indication of the presence. In some embodiments, determining whether a vehicle is present involves multiple communications to the server 18 of an indication of the presence or absence of a vehicle until an indication of presence is received by the server 18. In some embodiments, determining whether a vehicle is present involves multiple determinations of the presence or absence of a vehicle followed by one communication by the exit controller 26 to the server 18 when the presence is determined. In some embodiments, determining whether a vehicle is present involves detecting or receiving by the server 18 the sensed presence directly from the vehicle sensor 32. In some embodiments, block 76 directs the exit controller 26 CPU to determine whether a vehicle is present.

If by block 76 it is determined that no vehicle is present, then block 78 directs the server 18 CPU to perform error handling operations, which in variations may include performing operations similar to those described herein above in respect of block 50 (FIG. 4), with references in such description to entry or entrance being replaced by exit. In some embodiments, some or all of the error handling operations of block 78 are executed by the exit controller 26 CPU.

After block 78 has been executed, the process in the first embodiment returns to block 70. However, in some embodiments (not shown), the process returns to block 72.

If by block 76 it is determined that a vehicle is present, then block 80 directs the server 18 CPU to retrieve the status associated with the smart device 12 identification and to collect a parking fee. In the first embodiment, retrieving the status involves querying the database 20 for the status associated with the smart device 12 identification.

Figure 6:
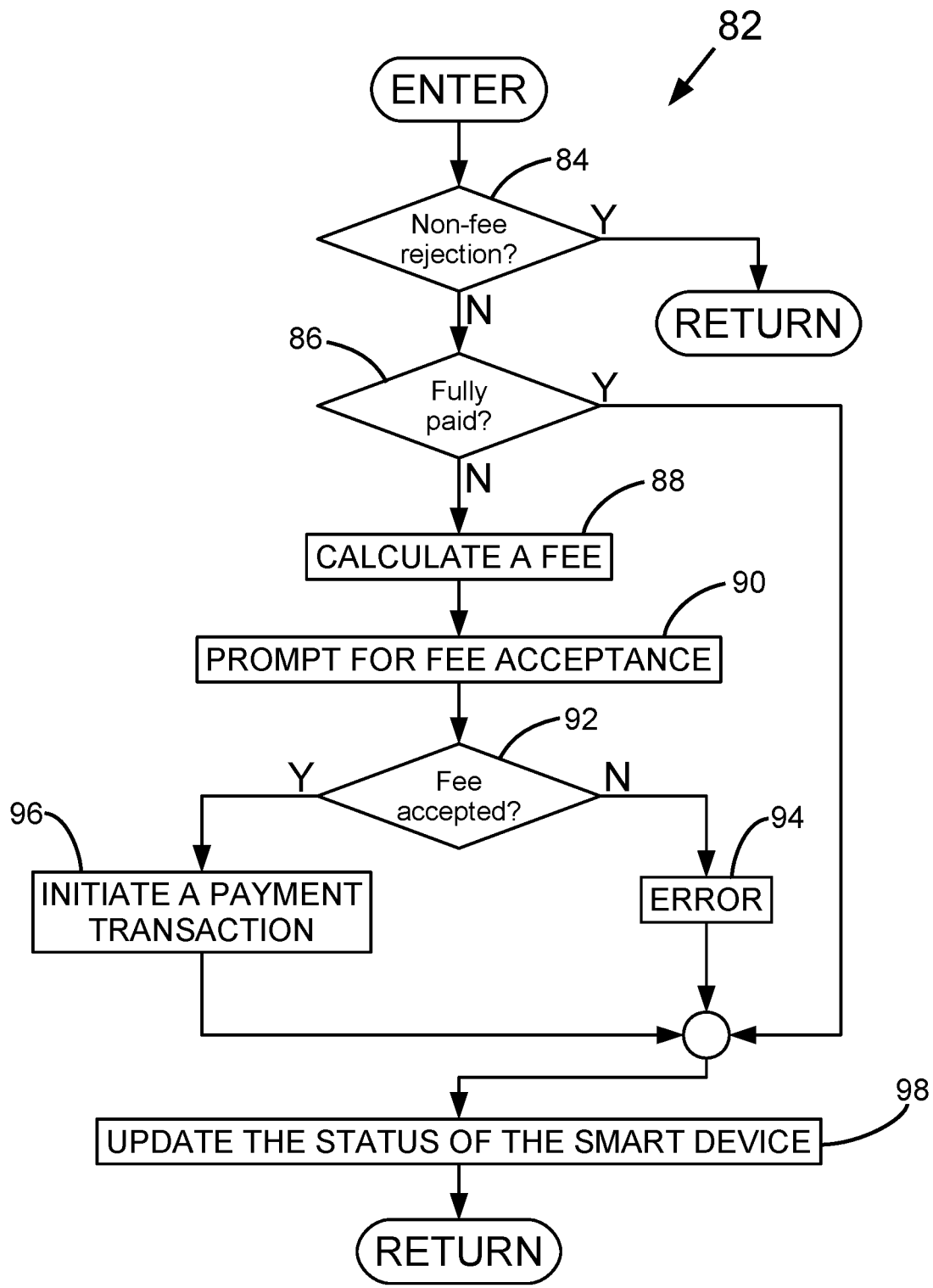
FIG. 6 is a flow diagram of an exemplary method for performing steps of collecting a parking fee in accordance with the second portion shown in FIG. 5, showing initiation of a payment transaction.

Referring to FIG. 6, an exemplary method for directing the server 18 CPU to perform steps of block 80 related to collecting a parking fee is shown generally at 82.

Method 82 begins execution at block 84, which directs the server 18 CPU in the first embodiment to determine whether the status associated with the smart device 12 identification indicates a non-fee rejection (i.e. an exit rejection for a reason other than payment of the parking fee, if any, for the current parking session).

If by block 84 the server 18 determines that the status does indicate a non-fee rejection, then the process is directed to return to the method 38 at block 80. In some embodiments, the process is directed to return to the method 38 at block 102 described herein below.

If by block 84 the server 18 determines that the status does not indicate a non-fee rejection, then block 86 directs the server 18 CPU to determine whether the status associated with the smart device 12 identification indicates that the financial account associated with the smart device 12 identification is fully paid (i.e. zero dollars owed). A determination that the smart device 12 account is fully paid may occur in the case of subscribers of time-unlimited parking during the period between periodic (e.g. monthly) payments, in the case when a parking fee was collected prior to exiting such as at entry, other situations, or any combination thereof for example.

If by block 86 the server 18 determines that the status indicates a fully paid account, then the process is directed to execute block 98 described herein below.

If by block 86 the server 18 determines that the status does not indicate a fully paid account, including possibly owing for the current parking session, then block 88 directs the server 18 CPU to calculate a parking fee. In various embodiments, calculating a parking fee involves any suitable calculation method, pricing scheme, or the like. For example, the parking fee may be calculated by multiplying a known parking rate by the duration of the current parking session, then possibly adding any amounts in arrears plus penalties or surcharges, if any, for example. In some embodiments, calculating a parking fee involves selecting an applicable parking rate from a plurality of parking rates associated with the parking lot. In some embodiments, calculating a parking fee involves selecting an applicable parking rate associated with the smart device 12 identification. In some embodiments, calculating a parking fee involves selecting an applicable parking rate associated with the smart device 12 status. In some embodiments, calculating a parking fee includes deducting an amount from the nominal fee, such as where a local business has offered to pay for a portion or all of the parking costs for parking to visit that business for example. In some embodiments, the server 18 receives the parking rate in a communication from an additional resource 22 (FIG. 1), such as a computerized third-party system for example.

After block 88 has been executed, block 90 then directs the server 18 CPU to prompt the smart device 12 for fee acceptance. In the first embodiment, prompting the smart device 12 for fee acceptance involves transmitting the fee by the server 18 to the smart device 12. The communications between the server 18 and the smart device 12 may be implemented by any suitable communications technology (e.g. near-field wireless communications, direct link 14, Internet 16, cellular telephone communications, satellite communications, other communications links, and any combination thereof for example). The smart device 12 CPU is then directed by its installed application program to display a fee prompt on a display screen of the smart device 12.

In some embodiments having a location sensor (implemented as an enhanced variation of the beacon 35 and/or 36) operable to conduct two-way communications with the smart device 12, block 90 may direct the location sensor to prompt the smart device 12 for fee acceptance, such as after the server 18 has transmitted the fee amount to the location sensor.

After block 90 has been executed, block 92 then directs the server 18 CPU to determine whether the parking fee has been accepted by the smart device 12. In the first embodiment, determining whether the parking fee has been accepted involves waiting to receive confirmation of acceptance or rejection from the smart device 12. Such confirmation may be transmitted by the smart device 12 in response to user input following a prompt displayed on the smart device 12, for example. In some embodiments, however, no user input is required and block 92 is omitted such that the method 82 proceeds directly after block 88 to block 96 described herein below. In the first embodiment, confirmation of rejection of the parking fee is determined by receiving a communication from the smart device 12 indicating the parking fee is not accepted. Additionally or alternatively, in some embodiments confirmation of rejection is determined by a time-out condition in which there is a failure to receive confirmation of acceptance after waiting a specifiable time-out duration.

If by block 92 the server 18 determines that the parking fee is not accepted by the smart device 12, then block 94 directs the server 18 CPU to perform error handling operations, which in variations may include updating a monetary account associated with the smart device 12 identification, transmitting an error message to the smart device 12 for display on the smart device 12 display screen, opening an informational webpage in a browser of the smart device 12, issuing an alert for a human attendant to assist the smart device 12 user, initiation of a telephone call between the smart device 12 and a telephone associated with the parking lot, transmitting an audio and/or text message to the smart device 12, displaying video of the scene captured by a security camera to a human attendant, issuing an alert to a human attendant to view the video display of the scene, flagging the smart device 12 account for subsequent invoicing, other error handling procedures, and any combination thereof for example.

If by block 92 the server 18 determines that the parking fee has been accepted by the smart device 12, then block 96 directs the server 18 CPU to initiate a payment transaction. Initiating a payment transaction may involve invoking any suitable payment transaction technology (e.g. credit card transaction, digital wallet, online money transfer service, etc.), including requesting payment processing by a third-party payment processing service (e.g. third-party credit card transaction, third-party digital wallet, third-party online money transfer service, etc.) accessible as an additional resource 22 for example. In some embodiments, block 96 directs the server 18 CPU to wait until completion of payment processing is confirmed before ending block 96, while in the first embodiment the server 18 CPU is directed to end execution of block 96 immediately after initiating the payment transaction.

After block 94 or 96 has been executed, block 98 then directs the server 18 CPU to update the status of the smart device 12. Typically, updating the status of the smart device 12 involves updating the database 20 contents to reflect the current payment status associated with the smart device 12 identification. In some embodiments, executing block 98 involves waiting until receiving confirmation of successful payment processing, if any. In some embodiments, however, updating the status involves updating the database 20 contents to reflect the initiation of payment processing, if any, such that a separate updating of the status can occur upon completion of payment processing.

After block 98 has been executed, the process is directed to end the method 82 and return to block 80 of the method 38 (FIG. 5).

Referring back to FIG. 5, after block 80 has been executed, block 100 then directs the server 18 CPU to determine whether the status associated with the smart device 12 identification indicates an exit rejection. The status may indicate an exit rejection in a variety of circumstances suited to particular embodiments of the invention, such as if the status indicates that the smart device 12 is not in compliance with payment requirements of the server 18, if an attempted payment transaction failed to successfully complete, or other status conditions for example.

If by block 100 the server 18 CPU determines that the status indicates an exit rejection, then block 102 directs the server 18 CPU to perform error handling operations, which in variations may include performing operations similar to those described herein above in respect of block 56 (FIG. 4).

After block 102 has been executed, the process in the first embodiment returns to block 68. However, in various embodiments (not shown), the process returns to any one of blocks 70, 72, 76 and 100, for example. In some embodiments, the particular error handling steps taken by block 102 determine the block to which the process returns after block 102 has been executed.

If by block 100 the server 18 CPU determines that the status indicates there is no exit rejection of the smart device 12, then block 104 directs the exit controller 26 CPU to cause the exit barrier to open. In the first embodiment, opening the exit barrier involves transmitting an open-barrier command by the server 18 CPU to the exit controller 26. In embodiments in which the server 18 in conjunction with the one or more vehicle sensors associated with a given parking stall implement a stall barrier and its associated entry and/or exit controller(s) 24 and 26, block 104 typically directs the server 18 CPU to open the exit barrier by communicating a message to the smart device 12 indicating exit authorization (e.g. "Thank you for parking with us. Parking charges are collected in accordance with your payment preferences."). Additionally or alternatively, block 104 may direct the server 18 CPU to store in the database 20 (FIG. 1) an exit authorization value so as to prevent enforcement action such as further payment collections processing against the smart device 12 user account. In such embodiments in which the server 18 and the one or more vehicle sensors associated with a given parking stall implement a stall barrier, the functionality of block 104 may be considered to have been performed by block 100 upon determination by the server 18 CPU that the status indicates there is no exit rejection of the smart device 12. While FIG. 5 shows a particular sequence for executing blocks 72, 76 and 100, in general these blocks may be executed in any order.

Block 106 directs the exit controller 26 CPU to determine whether a vehicle has exited past the exit barrier, such as an exit gate (not shown). Determining whether a vehicle has exited past the exit barrier involves determining whether the vehicle at the exit location has vacated the exit location and become present at the exterior side of the exit barrier. In the first embodiment, such method step involves sensing by the vehicle sensor 32 the absence of a vehicle and subsequently sensing by the vehicle sensor 34 the presence of a vehicle; and detecting the sensed absence and the sensed presence by the exit controller 26. In some embodiments, executing block 106 also involves communicating indications of vehicle absence and/or presence by the exit controller 26 to the server 18. In some embodiments, determining whether the vehicle has exited involves multiple sensing by the vehicle sensors 32 and 34 until a vehicular exit is determined. In some embodiments, determining whether the vehicle has exited involves receiving by the server 18 sensed absence and/or presence directly from the vehicle sensor 32 and/or from the vehicle sensor 34. In some embodiments, block 106 directs the server 18 CPU to determine whether the vehicle has exited.

If by block 106 it is determined that a vehicle has not exited, then block 108 directs the server 18 CPU to perform error handling operations, which in the first embodiment involves communicating by the exit controller 26 to the server 18 an indication that the vehicle has not exited. In variations, performing error handling operations may include performing operations similar to those described herein above in respect of block 62 (FIG. 4).

After block 108 has been executed, the process in the first embodiment returns to block 68. However, in various embodiments (not shown), the process returns to any one of blocks 70, 72, 76, 100 and 106, for example. In some embodiments, the particular error handling steps taken by block 108 determine the block to which the process returns after block 108 has been executed.

If by block 106 it is determined that the vehicle has exited, then block 110 directs the exit controller 26 CPU to cause the exit barrier to close. In some embodiments, such as where it is the server 18 that determines whether the vehicle has exited, closing the exit barrier involves transmitting a close-barrier command by the server 18 CPU to the exit controller 26. In some embodiments, block 110 directs the server 18 CPU to directly close the exit barrier. In embodiments in which the server 18 in conjunction with the one or more vehicle sensors associated with a given parking stall implement a stall barrier and its associated entry and/or exit controller(s) 24 and 26, block 110 is typically omitted.

For a barrier such as a stall barrier that remains open during the parking session, the method 38 involves closing the stall barrier (e.g. moving it back into its obstruction position or otherwise indicating that access is restricted) at any time after the vehicle has vacated the parking stall. In some embodiments, the method involves closing the stall barrier as soon as it is determined that the vehicle has vacated the restricted parking stall, while in some embodiments the method involves closing the stall barrier when the outer perimeter exit barrier is being closed, or at any time therebetween. For example, the method 38 may involve closing the stall barrier after executing block 100 if the status associated with the smart device 12 identification indicates there is no exit rejection of the smart device 12, a vehicle was determined by block 76 to be present at an outer perimeter or interior exit location away from the restricted parking stall, and the smart device 12 location was determined by block 72 to be at an outer perimeter or interior exit location away from the restricted parking stall. The method may involve closing a stall barrier in addition to opening and/or closing other exit gate(s).

After block 110 has been executed, block 112 then directs the server 18 CPU to store an exit timestamp, decrement the vehicle count, and notify selected third parties of the exit associated with the smart device 12 identification. In the first embodiment, executing block 112 involves transmitting by the exit controller 26 to the server 18 an exit-barrier status indicating that the exit barrier is closed. In some embodiments, executing block 112 involves transmitting the exit-barrier status in association with the smart device 12 identification. In the first embodiment, storing an exit timestamp involves storing the current time in the database 20 in association with the smart device 12 identification, and decrementing the vehicle count involves updating a vehicle count stored in the database 20. In the first embodiment, notifying selected third parties involves communicating notifications, if any, indicating a parking session has ended. The notifications are typically communicated in response to a list of third-party systems (shown in FIG. 1 as additional resources 22), such as parking reservation systems or third-party systems that were previously selected by the smart device 12 user to be notified when the smart device 12 user exits from the parking lot.

In embodiments having further exit barriers, various steps of the method 38 shown in FIG. 5 may be repeated at each of the further exit barriers. For example, blocks 70 to 80 and 100 to 110 may be repeatedly executed, with the exception that typically the parking fee for a given parking session is only collected once. In some embodiments where repeated confirmations of the smart device 12 identification are desirable, block 68 may also be repeated. Block 112 is typically executed only once for each parking session.

After block 112 has been executed, the server 18 CPU is directed to end the method 38.

While FIGS. 4 to 6 show initiating a payment transaction by executing block 96 of FIG. 6 at the conclusion of a parking session prior to exiting the parking lot, in general block 96 may be executed at any time before, during or after a given parking session.

While not shown in FIGS. 4 to 6, the method 38 includes in some embodiments the step(s) of providing parking lot information from the server 18 to the smart device 12 in a manner described herein above in respect of FIG. 2. Such provision of parking lot information may occur at any time before, during or after execution of the method 38 shown in FIGS. 4 to 6.

Thus, there is provided a computer-implemented method of managing a parking lot, the method involving: (a) authorizing an entry of a first vehicle by a computerized parking controller in response to a status indicating no entry rejection of a smart device, a first location indicating that the smart device is located at an entry location of the parking lot, and a first presence indicating that the first vehicle is present at the entry location, the first location being determined by the parking controller in response to an entry-beacon identification of an entry beacon of the parking lot, the entry-beacon identification being communicated to the parking controller by the smart device in a first communication; (b) determining by the parking controller an updated value of the status in response to a payment transaction associated with the smart device; and (c) authorizing an exit of a second vehicle by the parking controller in response to the status indicating no exit rejection of the smart device, a second location indicating that the smart device is located at an exit location of the parking lot, and a second presence indicating that the second vehicle is present at the exit location, the second location being determined by the parking controller in response to an exit-beacon identification of an exit beacon of the parking lot, the exit beacon being selected from the group consisting of the entry beacon and another beacon separate from the entry beacon, the exit-beacon identification being communicated to the parking controller by the smart device in a second communication, the exit location being selected from the group consisting of the entry location and another location separate from the entry location, the second vehicle being the first vehicle or another vehicle separate from the first vehicle.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A computer-implemented method of managing a parking lot, the method comprising:
   (a) authorizing an entry of a first vehicle by a computerized parking controller in response to a status indicating no entry rejection of a smart device of a user, a first location indicating that the smart device is located at an entry location of the parking lot, wherein the parking lot is located at the first location, and a first presence indicating that the first vehicle is present at the entry location, the first location being determined by the parking controller in response to an entry-beacon identification of an entry beacon of the parking lot, the entry-beacon identification being communicated to the parking controller by the smart device in a first communication; wherein the parking lot has an entry barrier for regulating entries at the entry location, and wherein step (a) further comprises opening the entry barrier by the parking controller so as to authorize the entry of the first vehicle into the parking lot;
   (b) determining by the computerized parking controller an updated value of the status in response to a payment transaction associated with the smart device; and
   (c) storing by a parking system server a list of a plurality of third party business entities located proximate to the parking lot at a plurality of other locations discrete from the first location;
   (d) selecting by the user of the smart device, prior to arrival at the entry location of the parking lot, at least one of the plurality of third party business entities stored by the parking system server to notify of the entry associated with the smart device at the entry location of the parking lot;
   (e) automatically communicating, by the parking controller, with a third party business server associated with the at least one of the plurality of third party business entities selected by the user, to provide a notification to the third party business server that the user of the smart device has arrived at the parking lot;
   (f) initiating, in response to the notification in step (e), preparation of an order for the user by the at least one of the plurality of business entities selected by the user.

2. The method of claim 1 wherein step (a) comprises receiving by the parking controller the first communication generated by the smart device response to the smart device receiving no more than a single user command entered into the smart device.

3. The method of claim 1 wherein step (a) comprises authorizing the entry of the first vehicle in response to an identification of the smart device selected from the group consisting of a telephone number, device identification code, license plate number, an image of a license plate, driver's license number, an image of a driver's license, officially-issued identification number, an image of an officially-issued identification certificate, a vehicle identification code, and a financial card number.

4. The method of claim 1 wherein step (a) comprises authorizing the entry of the first vehicle in response to the status indicating that the smart device is registered with the parking controller and is in compliance with payment requirements of the parking controller.

5. The method of claim 1 further comprising determining by the parking controller a parking fee in response to a parking rate associated with the smart device.

6. The method of claim 5 wherein determining by the parking controller a parking fee in response to a parking rate associated with the smart device comprises determining the parking fee in response to a duration of time spent parking.

7. The method of claim 1 wherein step (a) comprises opening a stall barrier by the parking controller so as to authorize the entry of the first vehicle.

8. The method of claim 1 further comprising communicating by the parking controller to at least one of the smart device and a computerized third-party system a notification generated by the parking controller in response to the parking controller authorizing the entry of the first vehicle, the notification indicating the entry of the first vehicle in association with the smart device.

9. The method of claim 1 further comprising communicating by the parking controller to at least one of the smart device and a computerized third-party system a notification generated by the parking controller in response to the parking controller authorizing the exit of the second vehicle, the notification indicating the exit of the second vehicle in association with the smart device.

10. The method of claim 1 comprising receiving by the parking controller a parking reservation request associated with the smart device and the parking lot.

11. The method of claim 10 wherein receiving by the parking controller a parking reservation request associated with the smart device and the parking lot comprises receiving the parking reservation request from a computerized parking reservation system.

12. The method of claim 1 further comprising determining by the parking controller a lot occupancy for the parking lot by maintaining a count of the difference between the number of authorized entries and authorized exits.

13. The method of claim 12 further comprising communicating by the parking controller the lot occupancy to a third-party computerized system.

14. The method of claim 13 wherein communicating by the parking controller the lot occupancy to a third-party computerized system comprises communicating to a computerized parking reservation system.

15. The method of claim 14 comprising receiving by the parking controller from the computerized parking reservation system a parking reservation request associated with the smart device and the parking lot.

16. The method of claim 1 further comprising communicating by the server to the smart device parking lot information associated with the parking lot, the parking lot information comprising the location of the parking lot.

17. The method of claim 1 further comprising communicating by the server to the smart device a notification of expiry of at least one of a parking session and a parking reservation.

18. The method of claim 1 further comprising communication by the server to a third-party computerized system a notification of expiry of at least one of a parking session and a parking reservation.

19. The method of claim 1 further including step (g) authorizing an exit of a second vehicle by the parking controller in response to the status indicating no exit rejection of the smart device, a second location indicating that the smart device is located at an exit location of the parking lot, and a second presence indicating that the second vehicle is present at the exit location, the second location being determined by the parking controller in response to an exit beacon identification of an exit beacon of the parking lot, the exit beacon being selected from the group consisting of the entry beacon and another beacon separate from the entry beacon, the exit-beacon identification being communicated to the parking controller by the smart device in a second communication, the exit location being selected from the group consisting of the entry location and another location separate from the entry location, the second vehicle being the first vehicle or another vehicle separate from the first vehicle.

20. The method of claim 19 wherein step (g) comprises determining by the parking controller whether the second vehicle is identified as the first vehicle.

21. The method of claim 19 wherein the parking lot has an exit barrier for regulating exits at the exit location, and wherein step (g) comprises opening the exit barrier by the parking controller so as to authorize the exit of the second vehicle.

22. The method of claim 21 further comprising closing the exit barrier by the parking controller in response to a third presence determined by the parking controller, the third presence indicating that the second vehicle is present at an exterior side of the exit barrier.

23. The method of claim 19 wherein the parking lot has an exit barrier for regulating exits at the exit location, the exit barrier being selected from the group consisting of the entry barrier and another barrier separate from the entry barrier, and wherein step (g) comprises opening the exit barrier by the parking controller so as to authorize the exit of the second vehicle.

24. The method of claim 19 wherein step (g) comprises receiving by the parking controller the second communication generated by the smart device in response to the smart device receiving no more than a single user command entered into the smart device.

25. The method of claim 19 wherein step (d) comprises authorizing the exit of the second vehicle in response to the status indicating that the smart device is registered with the parking controller and is in compliance with payment requirements of the parking controller.

26. The method of claim 25 wherein step (a) comprises authorizing the entry of the first vehicle in response to the status indicating that the smart device is registered with the parking controller and is in compliance with payment requirements of the parking controller.

27. The method of claim 19 further comprising opening a second entry barrier by the parking controller in response to the status indicating no second-entry rejection and to a third location determined by the parking controller, the third location indicating that the smart device is located in proximity to an entrance side of the second entry barrier.

28. The method of claim 27 wherein opening a second entry barrier by the parking controller in response to the status indicating no second-entry rejection and to a third location determined by the parking controller, the third location indicating that the smart device is located in proximity to an entrance side of the second entry barrier, comprises opening a stall barrier.

29. The method of claim 28 further comprising determining by the parking controller a parking fee in response to a parking rate associated with the smart device and a duration of time spent parking.

30. The method of claim 27 further comprising communicating by the parking controller to at least one of the smart device and a computerized third-party system a notification generated by the parking controller in response to the second entry barrier being opened, the notification indicating the entry of the first vehicle in association with the smart device.

31. The method of claim 19 further comprising closing the entry barrier by the parking controller in response to a third presence determined by the parking controller, the third presence indicating that the first vehicle is present at an interior side of the entry barrier.

32. A computerized system for managing a parking lot, the system comprising:
   (a) an entry beacon operable to transmit an entry-beacon identification of the entry beacon;
   (b) a first vehicle sensor operable to sense the presence of a first vehicle at a vehicle entry location of the parking lot located at a first location; and
   (c) a computer-implemented server operable to receive from a smart device of a user the entry-beacon identification, operable to determine the location of the smart device in response to said entry-beacon identification, operable to determine a status associated with the smart device, operable to authorize an entry of the first vehicle when the status indicates no entry rejection of the smart device, the determined location of the smart device is at the entry location, and the first vehicle sensor senses the presence of the first vehicle at the entry location, operable to determine an updated value of the status in response to a payment transaction associated with the smart device;
   (d) an entry barrier for regulating entries at the entry location of the parking lot;
   (e) an entry controller operable to open and close the entry barrier;
   (f) a parking lot server operable to cause the entry controller to open the entry barrier when the server authorizes the entry of the first vehicle;
   wherein the parking lot server is operable to store a list of a plurality of business entities located proximate to the parking lot at a plurality of other locations discrete from the first location and wherein the parking lot server is operable to allow the user of the smart device to select at least one of the plurality of business entities to notify of the entry associated with the smart device at the entry location of the parking lot;
   wherein the entry controller is configured to automatically communicate with a third party business server associated with the at least one of the plurality of third party business entities selected by the user to provide a notification to the third party business server that the user of the smart device has arrived at the parking lot; and
   wherein the third party business server is configured to initiate, in response to the notification, preparation of an order for the user by the at least one of the plurality of business entities selected by the user.

33. The system of claim 32 wherein the server is operable to determine a parking fee associated with the smart device in response to a duration of time spent parking.

34. The system of claim 32 further including an exit beacon operable to transmit an exit-beacon identification of the exit beacon, the exit beacon being selected from the group consisting of the entry beacon and another beacon separate from the entry beacon; a second vehicle sensor operable to sense the presence of a second vehicle at a vehicle exit location of the parking lot, the second vehicle sensor being selected from the group consisting of the first vehicle sensor and another vehicle sensor separate from the first vehicle sensor, the exit location being selected from the group consisting of the entry location and another location separate from the entry location, the second vehicle being the first vehicle or another vehicle separate from the first vehicle; and wherein the computer-implemented server is operable to receive from a smart device each of the entry-beacon identification and the exit-beacon identification, operable to determine the location of the smart device in response to said each of the entry-beacon identification and the exit-beacon identification, operable to authorize an exit of a second vehicle when the status indicates no exit rejection of the smart device, the determined location of the smart device is at the exit location, and the second vehicle sensor senses that the second vehicle is at the exit location.

35. The system of claim 34 wherein the parking lot has and exit barrier for regulating exits at the exit location, wherein the system comprises an exit controller operable to open and close the exit barrier, and wherein the server is operable to cause the exit controller to open the exit barrier when the server authorizes the exit of the second vehicle.

36. The system of claim 34 wherein the parking lot has an exit barrier for regulating exits at the exit location, the exit barrier being selected from the group consisting of the entry barrier and another barrier separate from the entry barrier, wherein the system comprises an exit controller operable to open and close the exit barrier, the exit controller being selected from the group consisting of the entry controller and another controller separate from the entry controller, and wherein the server is operable to cause the exit controller to open the exit barrier when the server authorizes the exit of the second vehicle.

* * * * *